(12) United States Patent
Hashimoto et al.

(10) Patent No.: US 12,032,478 B2
(45) Date of Patent: Jul. 9, 2024

(54) ELECTRONIC APPARATUS FOR TIME SERIES DATA MANAGEMENT, AND METHOD AND STORAGE MEDIUM

(71) Applicant: KABUSHIKI KAISHA TOSHIBA, Tokyo (JP)

(72) Inventors: Mikio Hashimoto, Bunkyo Tokyo (JP); Atsushi Shimbo, Bunkyo Tokyo (JP); Shinnosuke Yamaoka, Fuchu Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 400 days.

(21) Appl. No.: 17/472,506

(22) Filed: Sep. 10, 2021

(65) Prior Publication Data

US 2022/0188222 A1    Jun. 16, 2022

(30) Foreign Application Priority Data

Dec. 15, 2020    (JP) ................................. 2020-207831

(51) Int. Cl.
*H04L 9/32*        (2006.01)
*G06F 12/02*       (2006.01)
(Continued)

(52) U.S. Cl.
CPC ...... *G06F 12/0246* (2013.01); *G06F 12/0261* (2013.01); *H04L 9/3242* (2013.01);
(Continued)

(58) Field of Classification Search
None
See application file for complete search history.

(56) References Cited

U.S. PATENT DOCUMENTS 7,738,498 B1 *  6/2010  Yu ...................... H04N 21/4305
                                                           375/376
8,184,812 B2    5/2012  Margolis et al.
(Continued)

FOREIGN PATENT DOCUMENTS

CN        104361907 A    *  2/2015
JP        H08190322 A    *  7/1996
(Continued)

OTHER PUBLICATIONS

"How Time Stamps Work", Japan Data Communications Association, 2020, Accessed at https://www.dekyo.or.jp/tb/contents/summary/system_2.html.
(Continued)

*Primary Examiner* — Eleni A Shiferaw
*Assistant Examiner* — Ali H. Cheema
(74) *Attorney, Agent, or Firm* — Holtz, Holtz & Volek PC

(57) ABSTRACT

An electronic apparatus includes a controller. The controller includes an instruction executer configured to generate or acquire data, an issuer configured to accept a request and issues a time stamp, a first updater configured to update a first counter value according to a first operation, a second updater configured to update a second counter value in accordance with issuance of the time stamp, a first non-volatile memory to hold the first counter value and a secret key, and a volatile register to hold the second counter value. The time stamp is a message authentication code or a digital signature issued from the first and second counter values and the data. The second counter value is not stored in the first non-volatile memory.

11 Claims, 12 Drawing Sheets

(51) Int. Cl.
*G06F 12/14* (2006.01)
*H04L 9/06* (2006.01)

(52) U.S. Cl.
CPC .. *G06F 12/1408* (2013.01); *G06F 2212/1052* (2013.01); *G06F 2212/7209* (2013.01); *H04L 9/0643* (2013.01); *H04L 9/3297* (2013.01)

(56) References Cited

U.S. PATENT DOCUMENTS

| | | | |
|---|---|---|---|
| 10,326,453 B2 | 6/2019 | Walrant et al. | |
| 2002/0120851 A1* | 8/2002 | Clarke | H04L 9/3297 713/178 |
| 2003/0179607 A1* | 9/2003 | Orii | G06Q 20/357 365/189.07 |
| 2005/0182932 A1* | 8/2005 | Wheeler | H04L 9/12 713/168 |
| 2008/0016267 A1* | 1/2008 | Oyaizu | G06F 12/0246 711/E12.008 |
| 2008/0320315 A1 | 12/2008 | Frey et al. | |
| 2011/0099543 A1* | 4/2011 | Thorley | G06F 8/71 717/168 |
| 2012/0130160 A1* | 5/2012 | Borrye | A61B 1/00042 600/103 |
| 2016/0066319 A1 | 3/2016 | Sakata et al. | |
| 2018/0260127 A1* | 9/2018 | Shirota | G06F 3/0688 |
| 2019/0306357 A1* | 10/2019 | Koseki | G06F 3/1279 |
| 2020/0249930 A1 | 8/2020 | Abe | |
| 2021/0243123 A1* | 8/2021 | Rousseau | H04L 1/1642 |
| 2022/0094684 A1* | 3/2022 | Komedani | H04L 63/123 |

FOREIGN PATENT DOCUMENTS

| | | | | |
|---|---|---|---|---|
| JP | 2001076494 A | * | 3/2001 | |
| JP | 2002244554 A | * | 8/2002 | |
| JP | 2007064791 A | * | 3/2007 | G06F 21/10 |
| JP | 2007221435 A | * | 8/2007 | |
| JP | 2009144516 A | * | 7/2009 | |
| JP | 2010250413 A | * | 11/2010 | |
| JP | 5046165 B2 | | 7/2012 | |
| JP | 2016054349 A | | 4/2016 | |
| JP | 2020123253 A | | 8/2020 | |
| JP | 2020155026 A | | 9/2020 | |
| TW | I490869 B | * | 7/2015 | G11C 16/349 |
| WO | 2020246145 A1 | | 12/2020 | |

OTHER PUBLICATIONS

"Tips to Use Flash Memory as EEPROM", STMicroelectronics, EDN Japan, Microcomputer Course Learned by Q&A (47), Jul. 29, 2019, p. 2/3. Accessed at https://ednjapan.com/edn/articles/1907/26/news018_2.html.

* cited by examiner

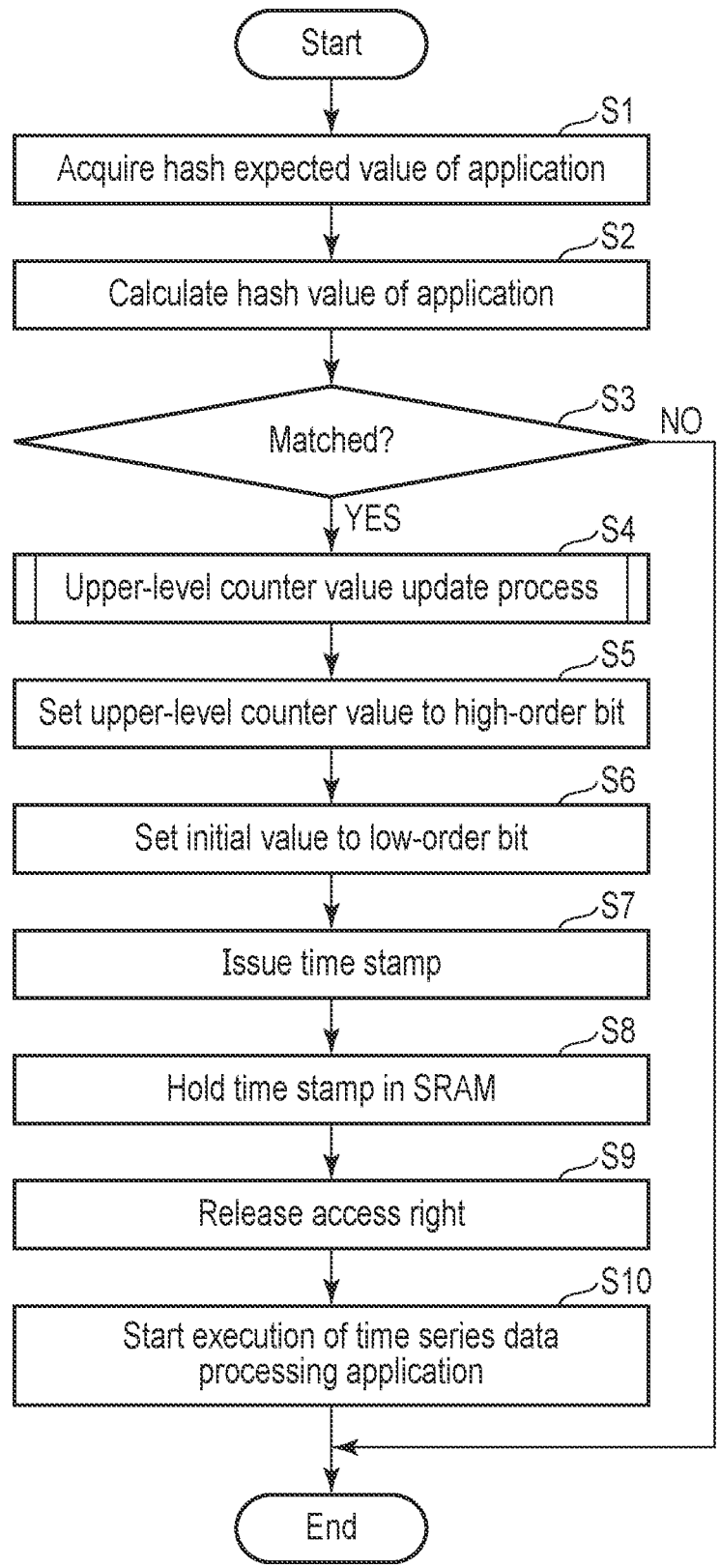
F I G. 4

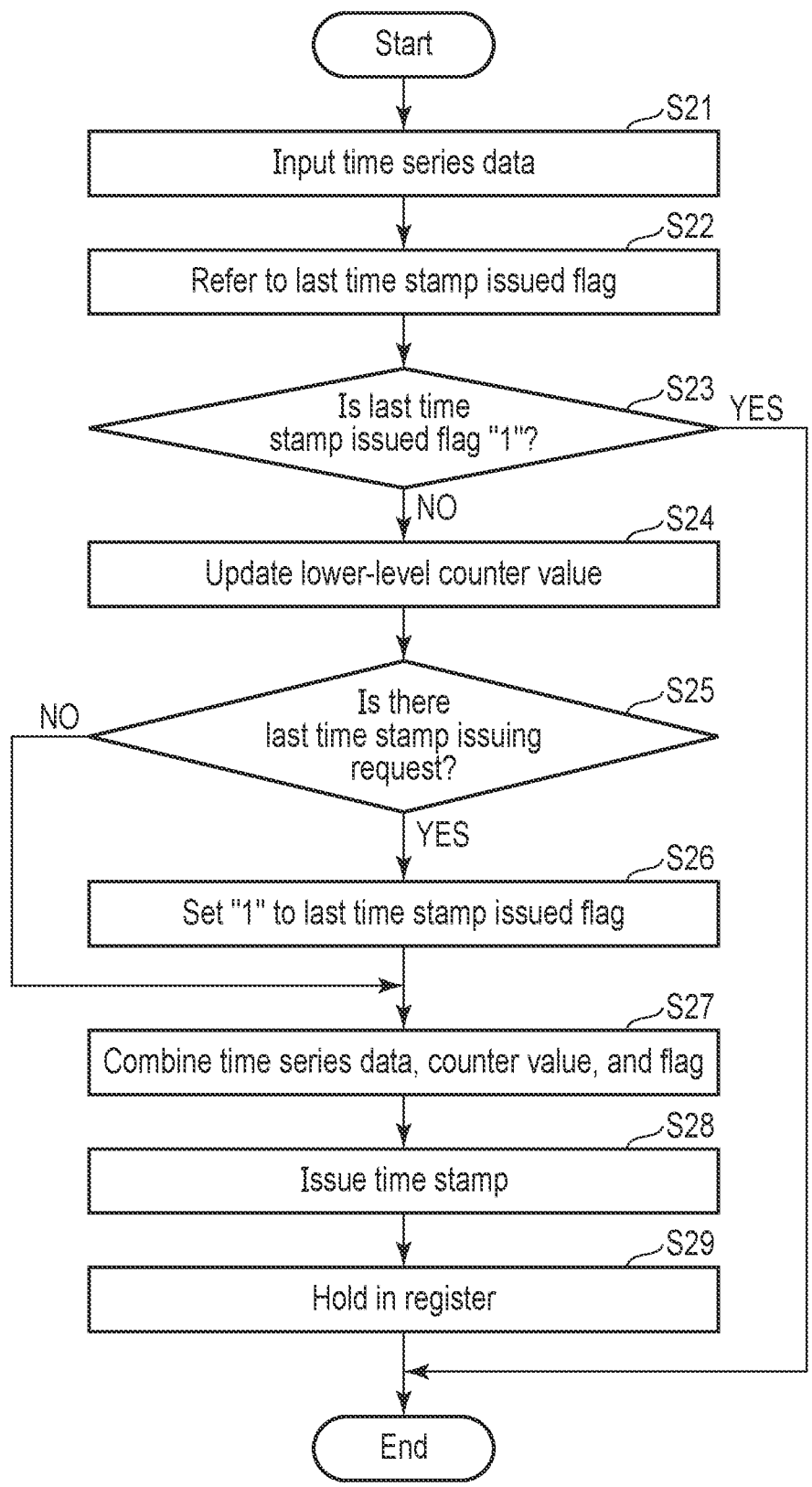
F I G. 5

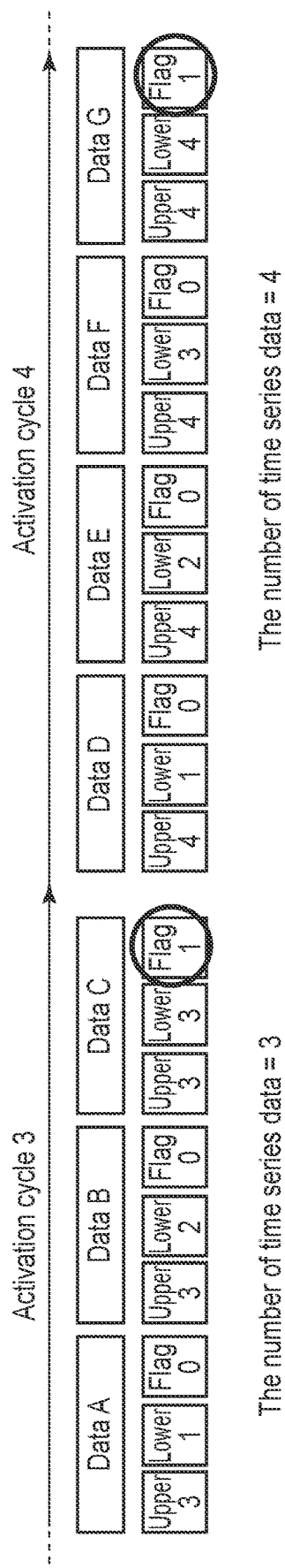
F I G. 7

ELECTRONIC APPARATUS FOR TIME SERIES DATA MANAGEMENT, AND METHOD AND STORAGE MEDIUM

CROSS-REFERENCE TO RELATED APPLICATIONS

This application is based upon and claims the benefit of priority from Japanese Patent Application No. 2020-207831, filed Dec. 15, 2020, the entire contents of which are incorporated herein by reference.

FIELD

Embodiments described herein relate generally to an electronic apparatus, a method, and a storage medium.

BACKGROUND

In recent years, an Internet of Things (IoT) technology has been widely known, but in the IoT technology, an information processing apparatus (electronic apparatus) operating as an edge device (IoT node) operates to transmit data (hereinafter, referred to as time series data) periodically measured by a sensor to a server apparatus. As a result, the server apparatus can collect the time series data from the information processing apparatus and use the time series data for various purposes.

The time series data is saved in the information processing apparatus (that is, locally), for example, in addition to being transmitted to the server. However, in the time series data locally saved in this manner including temporary storage, it is necessary to take measures against a threat such as falsification in the apparatus.

At this time, in addition to falsification of data itself, replacement of a generation order or erasing is one of the threats, and a low-cost measure against such a threat is required.

BRIEF DESCRIPTION OF THE DRAWINGS

FIG. 4 is a flowchart illustrating an example of a processing procedure of the MCU when the information processing apparatus is activated.

FIG. 5 is a flowchart illustrating an example of a processing procedure of the MCU after execution of a time series data processing application is started.

FIG. 7 is a diagram for specifically describing the number of pieces of time series data processed in an activation cycle.

DETAILED DESCRIPTION

Figure 1:
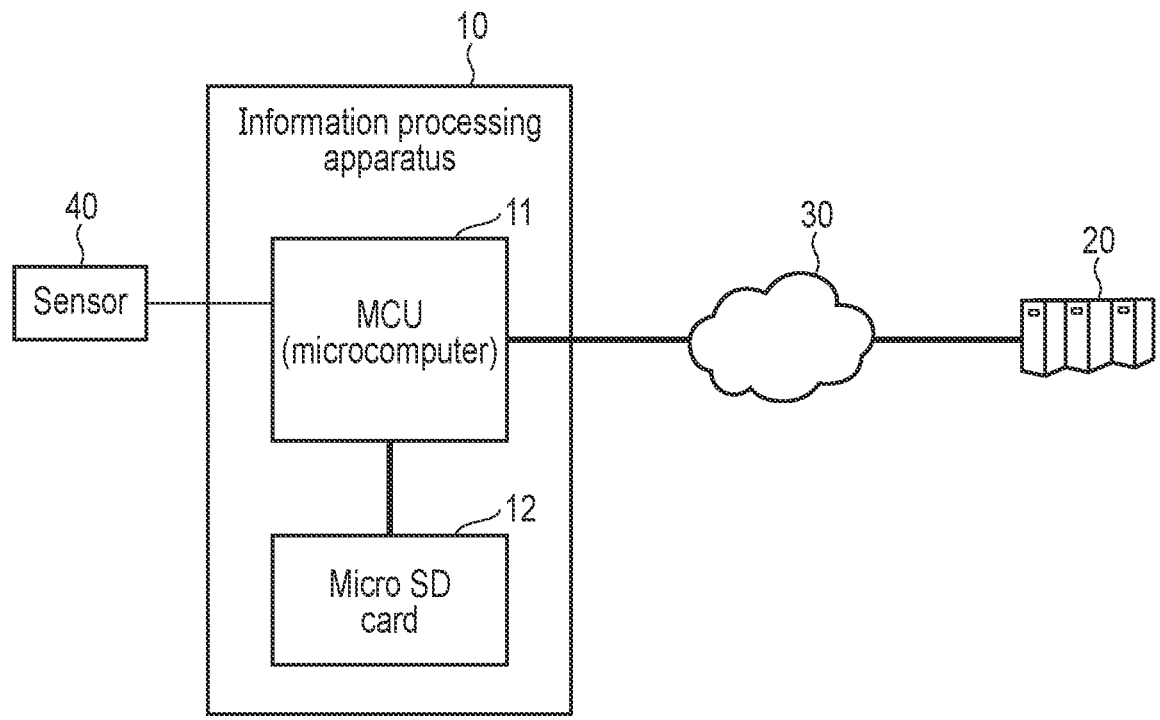
FIG. 1 is a diagram for explaining a usage mode of an information processing apparatus according to the embodiment.

In general, according to one embodiment, an electronic apparatus includes a controller. The controller includes an instruction executer configured to generate or acquire data, an issuer configured to accept a request for time stamp issuance for the data and issues a time stamp, a first updater configured to update a first counter value for managing an order of the data according to a first operation of the electronic apparatus, a second updater configured to update a second counter value for managing an order of the data in accordance with issuance of the time stamp, a first non-volatile memory to hold the first counter value and a secret key, and a volatile register to hold the second counter value. The time stamp is a message authentication code or a digital signature issued from the first counter value, the second counter value, and the data using the secret key. The second counter value is not stored in the first non-volatile memory.

Various embodiments will be described with reference to the accompanying drawings.

First, a usage mode of the information processing apparatus (electronic apparatus) according to the present embodiment will be briefly described with reference to FIG. 1.

An information processing apparatus 10 according to the present embodiment is an electronic apparatus that operates as an edge device (IoT node), and is communicably connected to a server apparatus 20 via a network 30 such as the Internet.

The information processing apparatus 10 includes a micro controller unit (MCU) 11. The MCU 11 is an embedded one-chip microcontroller (control unit) that controls the operation of the information processing apparatus 10. In the present embodiment, the information processing apparatus 10 (MCU 11) includes, for example, an instruction execution unit realized by an applicator program to be described later, and is configured to be able to generate or acquire data (hereinafter, referred to as time series data) periodically measured by a sensor 40 by the instruction execution unit.

Such time series data is transmitted from the information processing apparatus 10 to the server apparatus 20 and received by the server apparatus 20.

As a result, the server apparatus 20 can provide various services using the time series data by processing the time series data received from the information processing apparatus 10 (MCU 11).

Note that the server apparatus 20 may be a server apparatus that provides various cloud computing services, and a plurality of information processing apparatuses 10 may be connected to the server apparatus 20.

Here, for example, in a case where a problem (failure) or the like occurs in communication between the information processing apparatus 10 and the server apparatus 20, the time series data cannot be transmitted from the information processing apparatus 10 to the server apparatus 20.

As illustrated in FIG. 1, the information processing apparatus 10 includes a non-volatile memory such as a micro SD card 12 (memory card), and the time series data acquired in the time zone in which the communication failure occurs as described above can be saved in the micro SD card 12 (that is, local).

Meanwhile, as described above, the time series data transmitted from the information processing apparatus 10 to the server apparatus 20 is appropriately protected by the communication security, and the time series data received by the server apparatus 20 is also appropriately protected in the server apparatus 20 (cloud).

On the other hand, as described above, regarding the time series data locally saved in the information processing apparatus 10, there is a concern about a threat such as falsification due to physical access. Specifically, for example, the micro SD card 12 is configured to be detachable from the information processing apparatus 10, and in a case where the micro SD card 12 is detached from the information processing apparatus 10, there is a possibility that the time series data saved in the micro SD card 12 is falsified.

The time series data saved in the micro SD card 12 may include, for example, a log (communication log) related to communication between the information processing apparatus 10 and the server apparatus 20. Such a communication log is useful, for example, for analysis of a remote cyberattack or the like, and a countermeasure against a threat such as falsification is also necessary for the communication log.

Therefore, the information processing apparatus 10 according to the present embodiment uses a local time stamp technique in order to ensure the authenticity of the time series data (data measured by the sensor 40, a communication log, and the like) saved locally.

Hereinafter, an outline of the local time stamp technique will be briefly described with reference to FIG. 2. Note that the local time stamp (technique) is a technique for verifying (detecting) falsification of time series data saved in a physically accessible non-volatile memory (micro SD card 12), and is a term used in the present embodiment. Although referred to as a time stamp, the entity is a scheme in which a logical time based on a counter and a signature or MAC based on encryption are combined.

Figure 2:
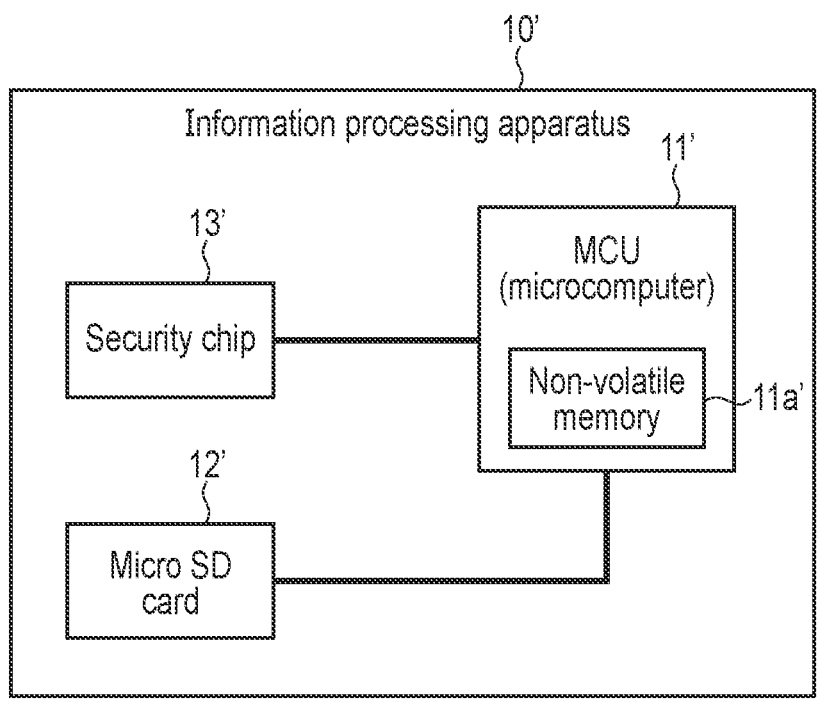
FIG. 2 is a diagram for describing an overview of a local time stamp technique.

Here, FIG. 2 illustrates an information processing apparatus 10' according to a comparative example of the present embodiment using a local time stamp (time stamp) technique. Note that the information processing apparatus 10' includes an MCU 11' and a micro SD card 12' corresponding to the MCU 11 and the micro SD card 12 illustrated in FIG. 1 described above, and a security chip 13'.

In such an information processing apparatus 10', the security chip 13' has a function of issuing a time stamp corresponding to time series data when the time series data is acquired by the MCU 11' as described above.

It is assumed that, for example, a previously-issued secret key is stored in the security chip 13'. Further, the security chip 13' includes a counter register (one-way counter or monotonic counter) for managing the order of the time series data described above. Note that this counter register holds a counter value that is incremented each time a time stamp corresponding to the time series data is issued. The decrementing process on the counter is prohibited. The time stamp corresponding to the time series data is issued using the secret key and the counter value.

Specifically, a message authentication code called HMAC can be used as the time stamp. In this case, the security chip 13' couples the secret key, the counter value, and the target data, and calculates a hash value of the coupled data, thereby issuing a message authentication code. By adding such a message authentication code to the time series data and the counter value and saving the data in the micro SD card 12', the message authentication code can be used as a pseudo time stamp. Note that the verification of falsification of the time series data is performed by comparing a message authentication code generated (issued) from the time series data, the secret key, and the counter value with a message authentication code added to the time series data. In addition, according to such a message authentication code, since falsification of the counter value can also be verified, it is also possible to realize order guarantee of the time series data based on the counter value.

Here, in the description, the time stamp is a message authentication code, but the time stamp may be, for example, a digital signature generated using a secret key.

According to the local time stamp technique described above, it is possible to implement a mechanism for securing authenticity of the time series data saved locally.

However, in order to realize the order guarantee of the time series data in the information processing apparatus 10' according to the comparative example of the present embodiment (that is, uniqueness of the counter value is ensured), it is necessary to repeatedly write the counter value incremented each time the time stamp corresponding to the time series data is issued in the non-volatile memory as described above. In a case where the register holding the counter is volatile, the counter returns to an initial value each time the power supply is turned off, and a plurality of time stamps for the same counter value is issued. Similarly, in a case where the counter is decremented by an unauthorized manipulation, two time stamps are issued to one counter value. Therefore, a mechanism for preventing the unauthorized manipulation of the counter value is also necessary.

Here, it is assumed that time series data is acquired at a high frequency in the IoT node, but it is known that a flash memory generally used as a MCU built-in non-volatile memory reaches a product life (rewrite life) by repeating data rewriting (that is, erasing and writing of data) to a memory page. Therefore, in the security chip 13', there is a case where an EEPROM or the like having a longer lifetime of the number of writes than the non-volatile memory 11a' (flash memory) built in the MCU 11' is used to manage the counter value. However, even in a case where the EEPROM having the number of writes of two million is used, for example, in a case of a configuration in which time series data is acquired and a time stamp is issued every one second, the product lifetime of the EEPROM is reached in about eight months.

That is, in the information processing apparatus 10' according to the comparative example of the present embodiment described above, it is necessary to separately prepare a non-volatile memory having a long product life, and the cost for realizing the mechanism for securing the authenticity of the time series data increases.

In a case where the EEPROM outside the MCU is used as the memory that holds the counter, from the viewpoint of preventing an unauthorized manipulation of the counter, it is necessary to provide the security chip 13' separately from the MCU 11' that is a one-chip microcontroller in the information processing apparatus 10' according to the comparative example of the present embodiment. The security function of issuing the time stamp cannot be realized by one chip (that is, made into one chip). In order to integrate the security function into one chip, it is conceivable to use the non-volatile memory 11a' (flash memory) built in the MCU 11' for the management of the counter value described above, but, in this case, the product life is further shortened as compared with the EEPROM. This is because the flash memory built in the MCU stores a large capacity program, and thus, priority is given to reduction of the area at the expense of the number of writes that is generally in a trade-off relationship.

Therefore, the present embodiment has a configuration that realizes a mechanism for securing authenticity of the time series data (order guarantee of the time series data). In the following description, data saved in the micro SD card 12 is referred to as time series data, but the time series data may be data transmitted from the information processing apparatus 10 to the server apparatus 20 (for example, data measured by the sensor 40, and the like) or may be data not transmitted to the server apparatus 20 (for example, a communication log or the like). In addition, in the time series data, data transmitted to the server apparatus 20 (for example, sensor data or the like) and data not transmitted to the server apparatus 20 (for example, a communication log or the like) may be mixed.

Figure 3:
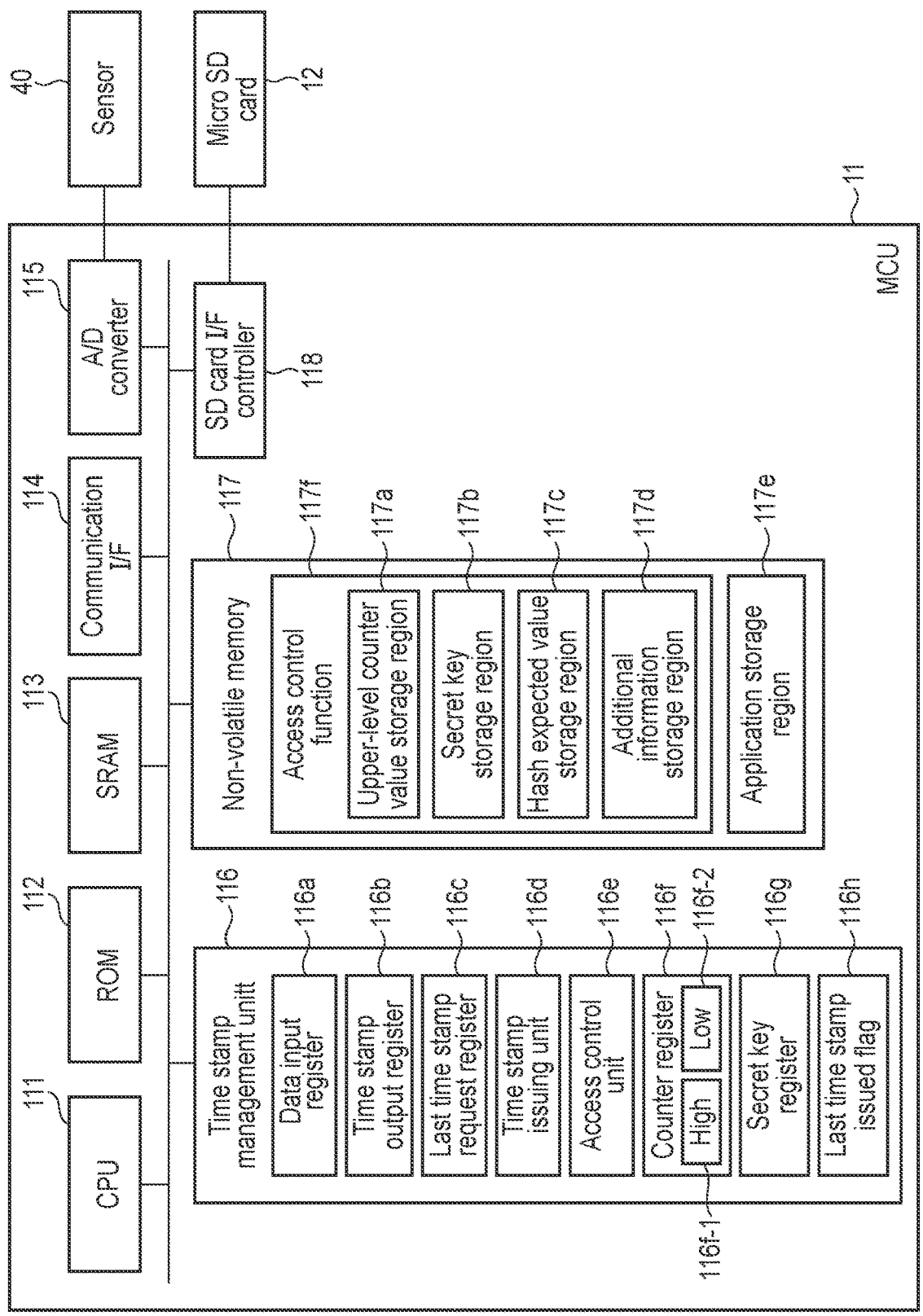
FIG. 3 is a block diagram illustrating an example of a configuration of an MCU provided in the information processing apparatus.

(Description of FIG. 3)

FIG. 3 is a block diagram illustrating an example of a configuration of the MCU 11 (control unit) included in the information processing apparatus 10 according to the present embodiment.

As illustrated in FIG. 3, the MCU 11 includes a CPU 111, a ROM 112, an SRAM 113, a communication interface (I/F) 114, an A/D converter 115, a time stamp management unit 116, a non-volatile memory 117, and an SD card interface (I/F) controller 118.

The CPU 111 is a processor that controls the operation of various components in the MCU 11 (the information processing apparatus 10). The CPU 111 may be a single processor or a plurality of processors. The CPU 111 executes, for example, various programs (software) stored in the non-volatile memory 117. The program executed by the CPU 111 includes an application program (hereinafter, referred to as a time series data processing application) for processing the above-described time series data, various types of firmware (FW), and the like. That is, the CPU 111 may serve as an instruction execution unit that generates and acquires the time series data by the program executed by the CPU 111. In addition, the CPU 111 may be referred to as a processing unit 111. The SRAM 113 is a main storage device used as a working memory of the CPU 111. The ROM 112 is a mask ROM to store an activation FW. The mask ROM is not rewritable. The time series data processing application is stored in an application storage region 117e as described later and can be rewritten.

The communication interface 114 is an interface that controls communication with an external device (for example, the server apparatus 20 or the like) of the information processing apparatus 10.

The A/D converter 115 is connected to the above-described sensor 40, and converts analog data periodically measured by the sensor into digital data to output the digital data.

(Description of Non-Volatile Memory)

The non-volatile memory 117 is, for example, a flash memory built in the MCU 11, and includes an upper-level counter value storage region 117a, a secret key storage region 117b, a hash expected value storage region 117c, an additional information storage region 117d, an application storage region 117e, and the like.

The upper-level counter value storage region 117a is a region in which the upper-level counter value described above is stored.

The secret key storage region 117b is a region in which a secret key used for issuing the above-described time stamp (message authentication code or digital signature) is stored.

The hash expected value storage region 117c is a region in which a hash expected value used to verify falsification of firmware (for example, boot firmware executed at the time of activation of the information processing apparatus 10) executed by the CPU 111 is stored. Note that the firmware itself is stored in the ROM (mask ROM) 112 described above.

The additional information storage region 117d is a region in which information used in various processes executed in the MCU 11 described later is stored.

The application storage region 117e is a region in which the time series data processing application executed by the CPU 111 is stored. Note that the time series data processing application in the present embodiment may be referred to as, for example, a general application, general firmware, or the like. Further, the time series data processing application also includes an RTOS that performs a communication process of performing a communication process with a server. In a case where there is a defect in the measurement algorithm of the time series data processing application or a vulnerability in the communication processing, the time series data processing application (general FW) is updated, and the adverse effects of the defect and the vulnerability can be eliminated after the update. For the update of the general FW in the MCU, a method described in JP 2017-33149 A and the like are known, but the implementation method is not limited thereto.

Note that, in the present embodiment, the counter register 116f, a last time stamp issued flag 116h, and the regions 117a to 117d included in the non-volatile memory 117, for example, can be accessed only when a predetermined authority (privilege) is given. An access control function 117f that limits an accessible range when a program stored in the application storage region 117e is executed is provided as a countermeasure against an unauthorized operation caused by an application vulnerability to be described later.

(Description of Time Stamp Management Unit)

The time stamp management unit 116 has a function (security function) of managing the above-described time stamp (such as a message authentication code or a digital signature). Note that, in the present embodiment, the time stamp management unit 116 is implemented as a hardware module for which internal access by the time series data processing application is prohibited.

The time stamp management unit 116 includes a data input register 116a, a time stamp output register 116b, a last time stamp request register 116c, a time stamp issuing unit 116d, an access control unit 116e, a counter register 116f, a secret key register 116g, and a last time stamp issued flag 116h. The counter register 116f includes a high-order bit storage unit 116f-1 and a low-order bit storage unit 116f-2.

The micro SD card 12 is a saving destination of large-capacity data. Unlike a flash memory to be described later, it does not have a physical access protection function, and thus is exposed to a threat of physical access and unauthorized rewriting or data erasure due to execution of unauthorized software.

The time stamp issuing unit 116d receives the time series data (a request for time stamp issuance for the data generated or acquired by the instruction execution unit described above) input to the data input register 116a, and issues (generates) a time stamp corresponding to the time series data to output the time stamp to the time stamp output register 116*b*. Note that the time stamp in the present embodiment is issued based on values set in the counter register 116*f*, the last time stamp issued flag 116*h*, and the secret key register 116*g* to be described later.

The access control unit 116*e* is a function of performing access restriction based on a privileged state in which access to the internal registers of the time stamp management unit (116*f* to 116*h*) is permitted from the CPU 111 only during an initial setting period performed at the time of activation described later with reference to FIG. 4, and a change to the internal registers of the time stamp management unit is prohibited from the CPU 111 during execution of an application stored in the application storage region 117*e* described later with reference to FIG. 5. Reading and writing during execution of the application is prohibited for the secret key register 116*g*.

A counter value for managing the order of the time series data is set (held) in the counter register 116*f*. Note that the counter register 116*f* is a volatile register to which a region of a volatile memory is allocated.

Here, as described above, for example, in a case where the order of the time series data is managed such that the counter value is simply incremented each time a time stamp is issued, it is necessary to write the counter value in the non-volatile memory each time the counter value is updated, and it is necessary to prepare a non-volatile memory having a long rewriting life.

On the other hand, in the present embodiment, the counter value set in the counter register 116*f* includes a counter value (hereinafter, denoted as an upper-level counter value) corresponding to the high-order bit and a counter value (hereinafter, denoted as a lower-level counter value) corresponding to the low-order bit.

In the present embodiment, the upper-level counter value is updated (incremented) in response to activation of the information processing apparatus 10 (execution of a process of activating the information processing apparatus 10), for example. Note that the upper-level counter value is set in the counter register 116*f* for a time stamp issuance process and the like, and the upper-level counter value is stored in the non-volatile memory 117 and managed so as to ensure uniqueness. More specifically, in the power-off state, the upper-level counter value is held in the non-volatile memory 117. The upper-level counter value at the time of initialization after power-on is initially set in the high-order bit equivalent region of the volatile counter register 116*f* after an increment operation is performed on the upper-level counter value stored in the non-volatile memory 117 at the time of execution of the initialization program stored in the mask ROM 112. Details will be described later with reference to FIG. 4.

On the other hand, the lower-level counter value is updated (incremented) each time a time stamp is issued by the time stamp issuing unit 116*d*. Note that the lower-level counter value is not stored in the non-volatile memory 117 but is held and managed in the counter register 116*f* (volatile memory). Details will be described later with reference to FIG. 5.

In the present embodiment, as described above, the upper-level counter value updated in response to the activation of the information processing apparatus 10 is stored (written) in the non-volatile memory 117, and the lower-level counter value updated every time the time stamp is issued is not stored (not written) in the non-volatile memory 117, whereby an effect of reducing the number of times of rewriting of the counter value for the non-volatile memory 117 with respect to the number of times of time stamp issuance can be obtained.

Here, for example, it is conceivable to manage the total number of time stamps issued as a countermeasure against a threat that data saved in the micro SD card 12 is illegally erased. In a case where the order of the time series data is managed by the upper-level counter value and the lower-level counter value as described above, it is necessary to grasp the number of time stamps issued during a cycle (hereinafter, referred to as an activation cycle) in which the upper-level counter value is updated.

Therefore, in the case of the configuration in which the upper-level counter value is updated in response to activation of the information processing apparatus 10 as described above, control using the last time stamp request register 116*c* and the last time stamp issued flag 116*h* is performed. Although details will be described later with reference to FIG. 5, the end of the activation cycle described above is managed using the last time stamp issued flag 116*h*.

The SD card interface controller 118 is connected to the micro SD card 12 via a serial bus (SPI), and is configured to output the above-described time series data, time stamp, and the like to the micro SD card 12.

In the present embodiment, the description will be given assuming that the micro SD card 12 is used, but the micro SD card 12 may be, for example, a general-purpose external non-volatile memory.

(Description of FIG. 4)

Hereinafter, an operation of the information processing apparatus 10 (MCU 11) according to the present embodiment will be described. First, an example of a processing procedure of the MCU 11 when the information processing apparatus 10 is activated will be described with reference to the flowchart of FIG. 4.

In the present embodiment, at the time of activation of the information processing apparatus 10, the boot firmware stored in the ROM 112 is executed by the CPU 111, and a series of initial setting procedures is executed.

Specifically, when the information processing apparatus 10 is powered on, the boot firmware stored in the mask ROM 112 is executed, and falsification verification of the application storage region 117*e* to be activated after completion of the initialization process is performed. At the time of executing the mask ROM executed immediately after activation, access to the information stored in the regions 117*a* to 117*d* is enabled, and after completion of the activation process, access to the regions 117*a* to 117*d* is prohibited during execution of the application. The hash expected value of the application storage region 117*e* is acquired from the hash expected value storage region 117*c* included in the non-volatile memory 117 (step S1). Note that the hash expected value stored in the hash expected value storage region 117*c* is a hash value introduced when the application storage region is stored in the non-volatile memory 117. It can be acquired from the verification digital signature at the time of distribution of the application program stored in the application storage region 117*e*.

Next, a hash value of the application storage region 117*e* of the non-volatile memory 117 is calculated (step S2).

When the process of step S2 is executed, the hash expected value acquired in step S1 is compared with the hash value calculated in step S2, and it is determined whether the calculated hash value matches the hash expected value (step S3).

In a case where it is determined that the hash value calculated in step S2 does not match the hash expected value (NO in step S3), there is a possibility that the application stored in the application storage region 117e is falsified, and thus the activation of the information processing apparatus 10 is abnormally ended.

On the other hand, when it is determined that the hash value calculated in step S2 matches the hash expected value (YES in step S3), the initial setting of steps S4 to S9 included in the boot firmware stored in the mask ROM 112 is executed.

In this case, the CPU 111 accesses the upper-level counter value storage region 117a included in the non-volatile memory 117, and executes a process of updating the upper-level counter value stored in the upper-level counter value storage region 117a (hereinafter, it is referred to as an upper-level counter value update process) (step S4). Note that details of the upper-level counter value update process will be described later. Rewriting of the upper-level counter value storage region 117a of the non-volatile memory through the activation process from step S1 to step S10 and the application process of step S10 and the subsequent steps is performed only in step S4. A method of increasing the number of times of rewriting using the characteristics of the flash memory will be described in detail with reference to FIGS. 9 and 10 described later.

Next, the CPU 111 sets, via the access control unit 116e included in the time stamp management unit 116, the upper-level counter value updated by execution of the process in step S5 to the high-order bit of the counter value in the counter register 116f (step S5).

When the process in step S5 is executed, the CPU 111 sets an initial value to the low-order bit of the counter value in the counter register 116f via the access control unit 116e (step S6).

Here, the hash expected value stored in the hash expected value storage region 117c included in the non-volatile memory 117 has a function as identification information for identifying the version of the application (that is, software operating on the information processing apparatus 10). Therefore, by issuing a time stamp corresponding to such a hash expected value during activation (processing) of the information processing apparatus 10, it is possible to identify an application that has generated data of a subsequent time stamp. It is considered that it is possible to reliably identify the version of the application that has generated the data when a failure or the like occurs in the information processing apparatus 10, such as a data abnormality.

Therefore, in the present embodiment, the time stamp issuing unit 116d included in the time stamp management unit 116 issues a time stamp corresponding to the hash expected value (or the hash value calculated in step S2) stored in the hash expected value storage region 117c included in the non-volatile memory 117 (step S7). More specifically, since the time stamp of the application hash value is issued at the first time of the power cycle, the low-order bit is the initial value (0). By setting such a rule, an application executed in the power cycle can be identified. In addition, the last bit flag in the last time stamp issued flag 116h is set to "0 (OFF)" by the time stamp management unit 116 (access control unit 116b) at the time of activation of the information processing apparatus 10.

The first time stamp issuing procedure performed in response to the boot firmware request is basically the same as the procedure performed in response to the application request, and details will be described with reference to FIG. 5.

Note that the secret key used for issuing the time stamp is read from the secret key storage region 117b described above prior to the above procedure, and is held in the time stamp secret key register 116g in the time stamp management unit 116.

The time stamp issued in step S7 is read from the time stamp management unit 116 by the boot firmware stored in the mask ROM 112, and, together with the above-described hash expected value, the counter value set in the counter register 116f, and the last bit flag set in the last time stamp issued flag 116h, is held in a predetermined region of the SRAM 113 (step S8).

When the process of step S8 is executed, the access right described above is released (step S9), and the execution of the time series data processing application is started (step S10).

Although not illustrated in FIG. 4, the time stamp and the related information held in the SRAM 113 in step S8 are output to the micro SD card 12 and saved in the micro SD card 12. Since the saving destination of the time stamp varies depending on the use form of the system, the storage in the general-purpose non-volatile memory is performed under the responsibility of the application. Since it is difficult to change the boot firmware stored in the mask ROM 112 by the use form, the process up to the saving of the time stamp in the SRAM is performed.

(Description of FIG. 5)

Next, an example of the processing procedure of the MCU 11 (time stamp management unit 116) after the execution of the time series data processing application is started in step S10 illustrated in FIG. 4 will be described with reference to the flowchart of FIG. 5.

When the time series data processing application is executed by the CPU 111, the process in which the time series data is acquired in the MCU 11 and the acquired time series data is output (saved) to the micro SD card 12 is executed.

First, when the time series data is acquired in the MCU 11, the time stamp management unit 116 inputs the time series data (step S21). Note that the time series data input to the time stamp management unit 116 is held in the data input register 116a. Furthermore, as described above, only at the time of issuance of the last time stamp prior to shutdown of the information processing apparatus 10, the application (instruction execution unit) sets "1" in the last time stamp request register 116c.

Here, the CPU 111 that executes the time series data processing application instructs the time stamp management unit 116 to issue a time stamp.

The time stamp management unit 116 (access control unit 116e) refers to the last time stamp issuance request register 116c based on the above-described instruction from the CPU 111 (step S22).

Here, the last time stamp issued flag 116h is an internal register of the time stamp management unit 116 indicating that the last time stamp has been issued once in the activation cycle, and cannot be directly operated from the application by the access control unit 116e.

In a case where "1" is set to the last time stamp issued flag 116h, since the last time stamp has already been issued, no time stamp is issued (NO in step S23).

When it is determined that the last time stamp issued flag 116h is "1" (YES in step S23), no time stamp is issued as described above, and thus the process illustrated in FIG. 5 ends.

On the other hand, when the last time stamp issued flag 116h is not "1" (acquisition and saving of the time series data is continuing) (NO in step S23), the low-order bit (that is, the lower-level counter value) of the counter set in the counter register 116*f* is updated (incremented) (step S24).

Here, the last time stamp request register 116*c* is referred to, and it is determined whether the time stamp generation request is a last time stamp issuance request or not (step S25).

When it is determined that "1" is set in the last time stamp request register 116*c* (YES in step S25), the time stamp management unit 116 sets the last bit flag "1 (ON)" (that is, the time stamp issuance prohibition flag) to the last time stamp issued flag 116*h* (step S26). By the process in step S23 described above, unless reactivation is performed after issuance of the time stamp, operation of issuing a new time stamp and setting the time stamp issued flag to "0" is prohibited.

On the other hand, when it is determined that "1" is not set in the last time stamp request register 116*c* (NO in step S25), the process in step S26 described above is not executed, and a state in which a new time stamp can be issued is maintained.

Next, the time stamp issuing unit 116*d* combines the time series data input in step S21, the counter values (the upper-level counter value and the lower-level counter value) set in the counter register 116*f*, and the last bit flag set in the time stamp issued flag 116*h* (step S27).

The time stamp issuing unit 116*d* issues a time stamp corresponding to the time series data, the counter value, and the last bit flag (hereinafter, referred to as combined data) combined in step S27 (step S28).

In this case, the time stamp issuing unit 116*d* may issue, as a time stamp, a message authentication code (HMAC) defined in FIPS 198-1 based on the combined data and the secret key held in the time stamp secret key register, or may issue, as a time stamp, a digital signature generated by encrypting the combined data using the secret key.

When the process in step S28 is executed, the time stamp issued in step S28 is held in, for example, the time stamp output register 116*b* in the time stamp management unit 116 (step S29).

Although not illustrated in FIG. 5, the time stamp held in the time stamp output register 116*b* in step S29 is read by the application, and, together with the time series data input in step S21, the counter value set in the counter register 116*f*, and the last bit flag set in the last time stamp issued flag 116*h*, is output to the micro SD card 12, and saved in the micro SD card 12. The saving destination at this point is not limited to the micro SD card, and may be temporarily saved in an EEPROM, an SRAM, or the like, and then collectively saved for each write size of the micro SD card 12.

(Supplemental Description of Relationship Between Effect and Initialization Procedure in FIG. 5)

The above-described process illustrated in FIG. 5 is executed every time the time series data is input to the time stamp management unit 116, but according to the process, it is possible to issue the time stamp corresponding to the time series data (combined data obtained by combining the counter value and the last bit flag) while updating the lower-level counter value every time the time series data is input. In the above description, the application executed in the CPU 111 is described as using the function of the time stamp management unit 116 after the execution of the initialization procedure described based on FIG. 4. However, as long as the counter register 116*f*, the last time stamp issued flag 116*h*, and the secret key register 116*g* in the time stamp management unit 116 are appropriately initialized in the initialization procedure, and the high-order bits of the counter are appropriately incremented, the effect of reducing the number of times of rewriting of the non-volatile memory in the time stamp issuance can be obtained by executing the initialization procedure of FIG. 5 even if the procedure is other than the procedure of FIG. 4.

Figure 6:
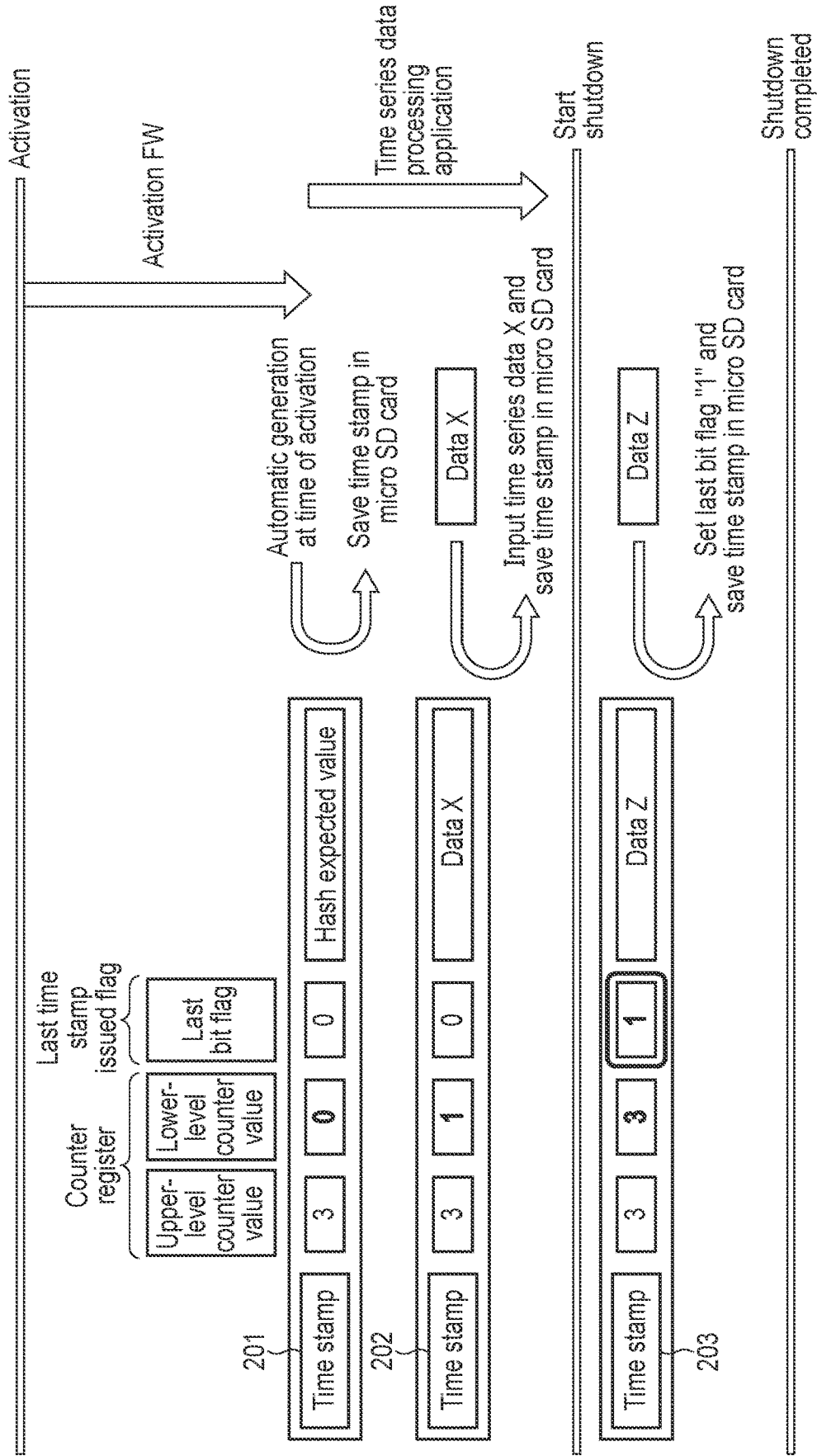
FIG. 6 is a diagram for schematically explaining a series of operations of the MCU.

(Description of FIG. 6)

Here, FIG. 6 is a diagram for schematically describing a series of operations (process) described in FIGS. 4 and 5 described above.

First, in a case where the information processing apparatus 10 is activated (or reactivated), a time stamp corresponding to the hash expected value (the counter value set in the counter register 116*f* and the last bit flag set in the last time stamp issued flag 116*h*) of the application is automatically generated, and the time stamp, together with the counter value, the last bit flag, and the hash expected value, is saved in the micro SD card 12 after activation of the application.

Here, in the description, the time stamp corresponding to the hash expected value is generated, but for example, a time stamp corresponding to a version number of the boot firmware or the like may be issued as identification information for identifying the version of the boot firmware.

In the example illustrated in FIG. 6, a time stamp 201 corresponding to the hash expected value is issued, and the time stamp 201, together with the upper-level counter value "3", the lower-level counter value "0", the last bit flag "0", and the hash expected value, is saved in the micro SD card 12.

When the time stamp 201 is issued as described above, the execution of the time series data processing application is started, and the time stamp corresponding to each of the time series data is issued.

Here, in a case where the time series data X is input to the time stamp management unit 116, the lower-level counter value is updated (incremented), and a time stamp 202 corresponding to the time series data X (upper-level counter value "3", lower-level counter value "1", and last bit flag "0") is issued as illustrated in FIG. 6. The time stamp 202, together with the upper-level counter value "3", the lower-level counter value "1", the last bit flag "0", and the time series data X, is saved in the micro SD card 12.

Note that, although not illustrated in FIG. 6, in a case where the time series data Y is input to the time stamp management unit 116 next to the time series data X, a time stamp corresponding to the time series data Y (upper-level counter value "3", lower-level counter value "2", and last bit flag "0") is issued, and the time stamp, together with the upper-level counter value "3", the lower-level counter value "2", the last bit flag "0", and the time series data Y, is saved in the micro SD card 12.

Next, it is assumed that the time series data Z is input to the time stamp management unit 116 after the shutdown (process) of the information processing apparatus 10 is started. The time series data Z can be data indicating whether the shutdown is a normal end based on some instruction or an abnormal end due to abnormality detection. In this case, the last bit flag "1" is set in the last time stamp issued flag 116*h* by the application, and a time stamp 203 corresponding to the time series data Z (upper-level counter value "3", lower-level counter value "3", and last bit flag "1") is issued. The time stamp 203, together with the upper-level counter value "3", the lower-level counter value "3", the last bit flag "1", and the time series data Z, is saved in the micro SD card 12. The setting of the last bit flag is merely preparation work performed prior to power-off. The application process may be required to save data in the micro SD card 12, and thus power supply shutdown is not automatically performed by setting the last bit flag.

After the time stamp 203 is issued (the last bit flag "1" is set), no time stamp is issued until the information processing apparatus 10 is restarted after the shutdown is completed. Therefore, the process in which an important event is conceived is required to be completed before setting the last bit flag. For example, in a case where a time stamp is added to a log of packet reception determined to be a remote attack and saved, the time stamp cannot be generated after the last bit flag is set. Therefore, in such a case, it is desirable to stop the communication function prior to the setting of the last bit flag.

In the present embodiment, the upper-level counter value (the number of times of activation) among the counter values set in the counter register 116f is managed in the non-volatile memory 117 (the upper-level counter value storage region 117a). On the other hand, the lower-level counter value (the number of times of time stamp issuance) and the last bit flag are managed the volatile memory (counter built-in memory) and are not written in the non-volatile memory 117.

In the present embodiment, as described above, the counter value (the upper-level counter value and the lower-level counter value) and the last bit flag set in the last time stamp issued flag 116h, together with the time series data and the time stamp, are saved in the micro SD card 12. According to the counter value and the last bit flag, it is possible to grasp the number of pieces of time series data processed in one activation cycle (that is, the number of pieces of time series data processed between the activation and the shutdown of the information processing apparatus 10). The fact that the data in which the last time stamp issued flag 116h is set to "1" is the last time stamp in the activation cycle and there is no valid time stamp having a counter value larger than the counter corresponding to the data is clear from the fact that after issuance of the last time stamp, issuance of a time stamp is prohibited by the determination process in S23 described above.

Specifically, in the example illustrated in FIG. 6, the upper-level counter value "3", the lower-level counter value "3", and the last bit flag "1", together with the time stamp 203, are saved in the micro SD card 12. In this case, since the last bit flag "1" is attached to the time stamp issued last during the period from the activation of the information processing apparatus 10 to the completion of the shutdown (that is, one activation cycle), according to the upper-level counter value "3", the lower-level, counter value "3", and the last bit flag "1" attached to the time stamp 203, it can be confirmed that three pieces of time series data are processed during, the period from the activation of the information processing apparatus 10 to the completion of the shutdown in the third time activation cycle of the information processing apparatus 10, and there is no subsequent time stamp.

That is, in the present embodiment, for example, when the activation cycles 3 and 4 are repeated as illustrated in FIG. 7, it can be confirmed that the number of pieces of time series data processed in the activation cycle 3 is 3 by referring to the lower-level counter value "3" together with the upper-level counter value "3" and the last bit flag "1" saved in the micro SD card 12. In the one-way counter, there is a problem that the total number of times of time stamp issuance cannot be identified in a case where saving of low-order bits is simply omitted. However, in the present embodiment, the number of times of time stamp issuance can be identified by storing a time stamp in which the last bit flag set in the last time stamp issued flag 116h is set for the last time stamp issuance request, together with data, an a general-purpose non-volatile memory having a low bit unit price without access control. As a result, a difficulty of reducing the number of times of rewriting of the counter non-volatile memory that requires access control and a difficulty of grasping the number of times of time stamp issuance are both resolved as compared with an existing method of saving all bits of the one-way counter in the non-volatile memory.

Similarly, by referring to the lower-level counter value "4" together with the upper-level counter value "4" and the last bit flag "1" saved in the micro SD card 12, it is possible to easily grasp that the number of pieces or time series data processed in the activation cycle 4 is 4. The time stamp is issued by sequentially incrementing low-order bits. The fact that the total number of pieces of time stamps issued in the power supply cycle is known means that even when part of these pieces of data is deleted, it is possible to find that data having discontinuous low-order bit numbers is deleted for some reason. In addition, in a case where the time stamp in which the last bit flag is set has been deleted, it is not possible to identify how many pieces of data have been deleted, but it can be seen that one or a plurality of pieces of data including at least the last time stamp has been deleted. This property is useful in analyzing a trace of an unauthorized program invasion ex post facto from logs saved. It is well known that an intruder from the outside performs unauthorized manipulation such as falsification or erasing of a log in order to erase the trace. Since the time stamp of the present exemplary embodiment can detect erasure in addition to log falsification, when no trace of attack can be detected in the log data before the erasure even when the erasure is found, there is a high possibility that the data before the erasure is not subjected to unauthorized manipulation. Since data loss may occur due to unexpected power shutdown or a software failure, it is necessary to separately analyze the data loss to identify that the data loss was caused by an attack, but it is obvious that the attack can be easily identified as compared with a case where there is no function of detecting falsification or erasing of data.

Here, it is important that the time stamp data including the last bit flag can be saved in an arbitrary page of a general-purpose non-volatile memory such as an SD card with a low bit unit price. In the present embodiment, by performing the time stamp issuance control using the last bit flag, it is possible to identify the total number of time stamp issued and detect data erasure without rewriting the MCU built-in non-volatile memory having a relatively high bit unit price, and holding the upper-level counter and the like at the time of power shutdown. The bit unit price of the general-purpose flash memory and the MCU built-in non-volatile memory will be described in detail later.

In the present embodiment, since the number of pieces of time series data for each activation cycle can be grasped as described above, it is also possible to grasp the total number of pieces of time series data processed in all the activation cycles.

(Intermediate Summary)

As described above, in the present embodiment, the MCU 11 (the control unit, issues a time stamp corresponding to each piece of time series data, updates the upper-level counter value (the first counter value) in response to activation (the first operation) of the information processing apparatus 10, and updates the lower-level counter value (the second counter value) in response to generation of the time stamp, in order to manage the order of the time series data. In addition, in the present embodiment, the time series data, and the time stamp and the counter value corresponding to the time series data are output to the micro SD card 12. In the present embodiment, the upper-level counter value is stored and managed in the non-volatile memory 117 (upper-level counter value storage region 117*a*) built in the MCU 11, and the lower-level counter value is not stored in the non-volatile memory 117 but is held and managed in the counter built-in memory (volatile memory).

In the present embodiment, with the above-described configuration, falsification of the time series data can be verified by the time stamp, and the order guarantee of the time series data can be realized by the counter value (the upper-level counter value and the lower-level counter value). Furthermore, in the present embodiment, since the non-volatile memory 117 (flash memory) built in the MCU 11 is used without separately preparing a non-volatile memory (EEPROM or the like), having a long lifetime, that manages the counter value, a mechanism for ensuring the authenticity of the time series data can be realized at low cost. The non-volatile memory 117 built in the MCU 11 can prohibit data access via the terminal by invalidating the access control function 117*f* and the debug function, while the value of the external general-purpose memory can be freely changed from the external terminal, so that the saving destination of important data such as the counter value and the secret key should be a flash memory built in the MCU. However, the MCU built-in memory represented by the flash memory has strict restrictions on the number of times of rewriting and the capacity, and the writing speed is slower than that of the SRAM. The present embodiment enables high-frequency time stamp issuance by reducing the number of times of rewriting of the MCU built-in memory essential for time stamp issuance that provides a function of protecting data on a general-purpose memory. In other words, according to the configuration of the present embodiment, the number of times of updating the upper-level counter value is set to the number of times lower in frequency than the normal number of times of time stamp issuance (that is, the number of times of updating the non-volatile memory 117 is reduced), and the process delay due to writing to the non-volatile memory 117 having a slower writing speed than the volatile memory is alleviated, so that it is possible to issue a time stamp with high frequency. Further, by explicitly issuing the last time stamp in the activation cycle, a function capable of validating the number of times of issuing the time stamp is provided even when saving of the lower counter is omitted.

Note that this embodiment is configured such that the time stamp management unit 116 is implemented as a hardware module and the time stamp management unit 116 is mounted on the MCU 11. The timestamp management unit 116 receives instructions to, for example, input data and input the final timestamp, and the procedure for generating timestamps from the data is executed by means of HW of the timestamp management unit 116. The updating of the lower bits of the counter, that is, the updating of the second counter value by the second updater, described in step S28 shown in FIG. 5 and the like is performed inside the timestamp management unit 116. With this configuration, even if an unauthorized program is executed in the instruction execution unit 111 due to a cyberattack via a communication network after the startup of the MCU 11, the unauthorized program cannot acquire time-stamped data with an invalid counter value. The updating of the upper counter (first counter value) referring to the non-volatile memory and the register setting described with reference to FIG. 4 and the like, correspond to the first updater. Note that the setting is set by the mask ROM program; however the risk of cyber-attacks in the initial settings can be avoided by not communicating until the completion of the initial settings after power-on. Further, the startup firmware that performs the initial setting procedure described with reference to FIG. 4 is assumed to be stored in ROM 112, but it may be stored in a rewritable non-volatile memory where measures are taken to prevent falsification by some unauthorized application. Note that FIG. 3 does not clearly illustrates the first updater and the second updater in the timestamp management unit 116. This is because the first updater is mainly realized by SW and the second updater is mainly realized by HW as described above. When both the first and second updaters are implemented as HW, the first and second updater are disposed inside the timestamp issuing section 116*d*, which performs timestamp calculation.

Furthermore, in the present embodiment, the upper-level counter value storage region 117*a* that stores an upper-level counter value is secured in the non-volatile memory 117 (instruction flash memory) in which the time series data processing application and the like are stored. In general, the non-volatile memory 117 (flash memory) incorporated in the MCU 11 has a large area of the control circuit with respect to the cell area. Therefore, for example, in a configuration in which the non-volatile memory 117 is divided (that is, the capacity of the non-volatile memory 117 is realized by two physically divided non-volatile memories), the area occupied by the two non-volatile memories is larger than the area occupied by the non-volatile memory 117 in a case where one non-volatile memory 117 is provided (hereinafter, referred to as a division loss). In the present embodiment, the non-volatile memory 117 (the non-volatile memory built in the MCU 11) is used without being divided to avoid a division loss, and access to the upper-level counter value storage region 117*a* is limited to the time of activation of the information processing apparatus 10, so that access contention at the time of execution of the time series data processing application can be avoided.

Figure 8:
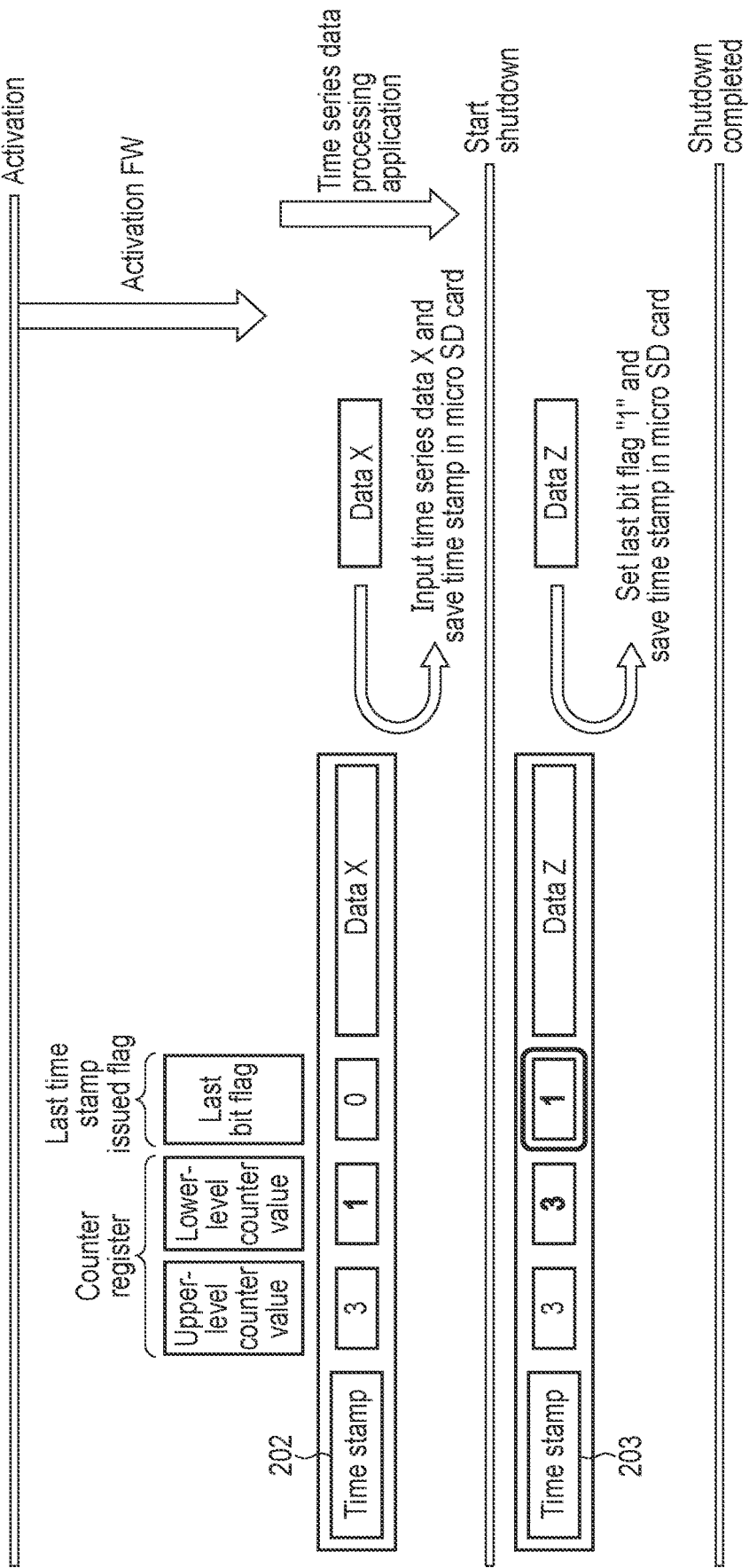
FIG. 8 is a diagram for describing a configuration in which a time stamp corresponding to identification information for identifying a version of software is not issued.

(Description of Effects of FIGS. 6 to 8)

Furthermore, in the present embodiment, the last bit flag indicating whether the shutdown (second operation) of the information processing apparatus 10 is started is set, and the last bit flag is output to the micro SD card 12, so that the number of pieces of time series data for each activation cycle can be easily grasped.

Furthermore, in the present embodiment, a secret key is stored in the non-volatile memory 117 (secret key storage region 117*b*), and the time stamp corresponding to the time series data is a message authentication code or a digital signature issued from the counter value, the last bit flag, and the time series data using the secret key. In the present embodiment, with such a configuration, it is possible to verify falsification of at least one of the time series data, the counter value, and the last bit flag saved in the micro SD card 12.

Note that, in the present embodiment, the case where the time series data and the like saved in the micro SD card 12 are falsified by physical access has been mainly described. However, for example, when there is a software vulnerability, there is a possibility that a cyberattack causing an unauthorized program to be executed by an unauthorized packet transmitted from a remote place may occur. According to the present embodiment, a time stamp is also issued to unauthorized data acquired (or generated) as a result of execution of such an unauthorized program, but such a time stamp is a time stamp that has been properly issued, so that the unauthorized data cannot be detected with the time stamp. However, even when the cyberattack as described above succeeds, it is not possible to return to the past and issue a time stamp (that is, the time stamp corresponding to the past time series data is regenerated). Therefore, when (counter value corresponding to) a period of the cyberattack can be identified, it is possible to salvage (rescue) valid past time series data based on the period. That is, in the present embodiment, even in a case where the cyberattack is performed, the authenticity of the past time series data can be secured.

Therefore, the information processing apparatus 10 according to the present embodiment is useful against both falsification by physical access to the micro SD card 12 and a remote cyberattack.

In the present embodiment, in the description, the micro SD card 12 (memory card) is used as a general-purpose external non-volatile memory, and the non-volatile memory 117 incorporated in the MCU 11 is a flash memory. However, other non-volatile memories may be used as the external non-volatile memory and the non-volatile memory 117 incorporated in the MCU 11.

Furthermore, in the present embodiment, while the information processing apparatus 10 is activated, a time stamp corresponding to identification information (a hash expected value, a version number, or the like) for identifying a version of software (for example, boot firmware or the like) operating on the information processing apparatus 10 is issued, and the time stamp and the identification information are output to the micro SD card 12. According to such a configuration, for example, in a case where the time series data has been processed by an unexpected operation of the information processing apparatus 10, it is possible to identify the version or the like of the software executed in the information processing apparatus 10 and to use the information for analysis of the operation or the like.

Note that, in the present embodiment, in the description, the time stamp corresponding to the identification information for identifying the version of the software during activation of the information processing apparatus 10 is issued as described above, but as illustrated in FIG. 8, the information processing apparatus 10 (MCU 11) according to the present embodiment may be configured not to issue such a time stamp but to issue a time stamp corresponding to the time series data.

Figure 9:
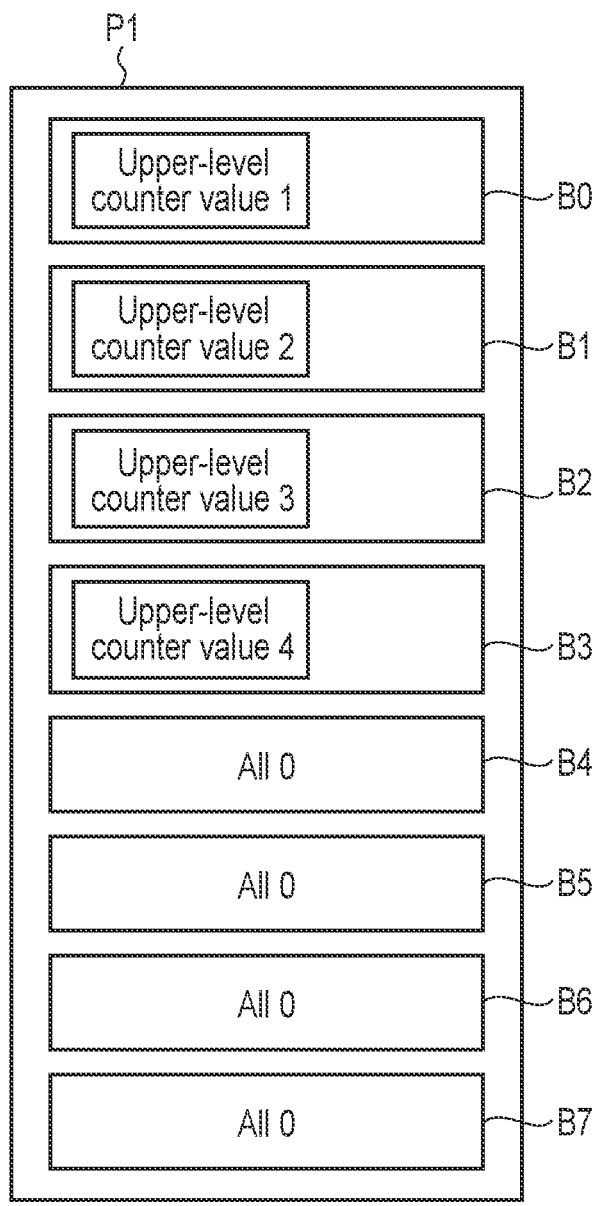
FIG. 9 is a diagram for explaining an upper-level counter value storage region.

(Description of FIG. 9)

Next, the upper-level counter value update process (process in step S4 illustrated in FIG. 4) will be described. First, the upper-level counter value storage region 117a included in the non-volatile memory 117 will be described with reference to FIG. 9.

When the non-volatile memory 117 is a flash memory (for example, a NAND flash memory or the like), the non-volatile memory 117 includes a memory cell array (a plurality of memory cells), and the memory cell array includes a plurality of pages. Each of the plurality of pages constituting the memory cell array includes a plurality of blocks. In the non-volatile memory 117, a page functions as a data erasing unit, and a block is a unit of a data writing operation (or a data reading operation).

Here, FIG. 9 illustrates a plurality of blocks constituting one page. In the example illustrated in FIG. 9, a page P1 includes eight blocks B0 to B7. Assuming that such a page P1 is allocated as the upper-level counter value storage region 117a, for example, the upper-level counter value 1 is written (stored) in the block B0 which is a unit of the data writing operation.

Next, for example, when the upper-level counter value 1 is updated to the upper-level counter value 2 by executing an upper-level counter value update process described later, the upper-level counter value 2 is written to the block B1. That is, in the present embodiment, the upper-level counter value is written (stored) in a form of being additionally written to an empty block.

Similarly, when the upper-level counter value 2 is updated to the upper-level counter value 3, the upper-level counter value 3 is written to the block B2, and when the upper-level counter value 3 is updated to the upper-level counter value 4, the upper-level counter value 4 is written to the block B3.

In the example illustrated in FIG. 9, it is indicated that no data (no upper-level counter value) is written in the blocks B4 to B7. Therefore, when the upper-level counter value 4 is updated, the updated upper-level counter value is written to the block B4.

In the present embodiment, in the description, a page is a data erasing unit. However, in the non-volatile memory 117 (flash memory), data written in each of the blocks B0 to B7 cannot be overwritten, and it is necessary to perform an operation of erasing data once in page unit and then writing data again.

Therefore, for example, in a case where the upper-level counter value is sequentially additionally written up to the block B7, the upper-level counter value is again written (additionally written) from the block B0 after the data written in the page P1 (blocks B0 to B7) is erased.

In FIG. 9, in the description, the upper-level counter value is written (stored) in one page P1, but the upper-level counter value may be written in a plurality of pages (that is, a plurality of pages may be allocated to the upper-level counter value storage region 117a).

In each page constituting the non-volatile memory 117 (memory cell), a block number is allocated to each of the plurality of blocks, and the upper-level counter value is additionally written such that the block numbers are in ascending order, for example. In the example illustrated in FIG. 9, the block numbers of the blocks B0 to B7 are "0" to "7", respectively.

In the following description, the upper-level counter value is written (stored) in the upper-level counter value storage region 117a included in the non-volatile memory 117 as described in FIG. 9.

Figure 10:
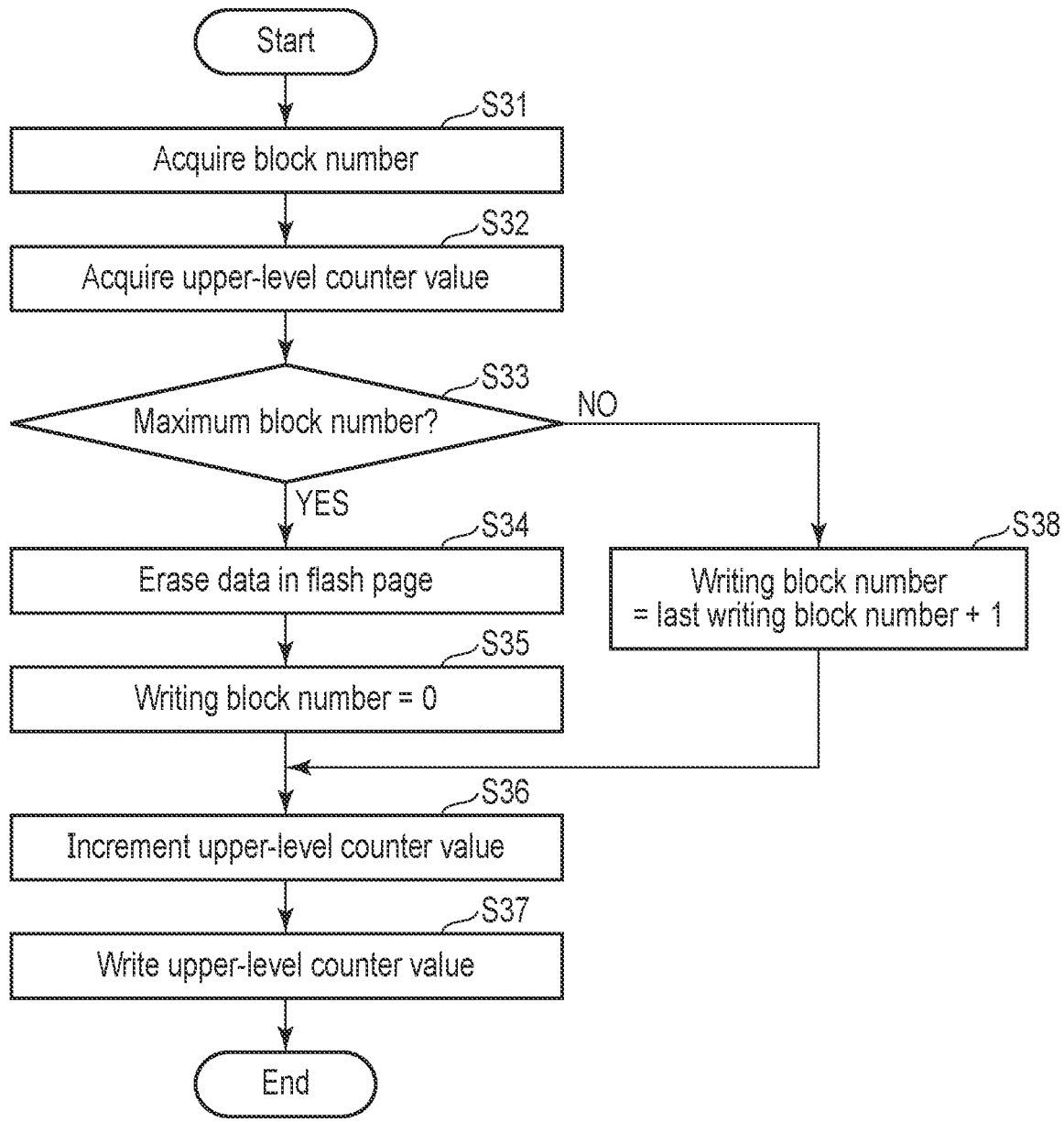
FIG. 10 is a flowchart illustrating an example of a processing procedure of an upper-level counter value update process.

(Description of FIG. 10)

Next, an example of a processing procedure of the upper-level counter value update process will be described with reference to a flowchart of FIG. 10. In the following description, the page of the non-volatile memory 117 allocated to the upper-level counter value storage region 117a is referred to as target page for convenience.

First, the CPU 111 to which the access right to the upper-level counter value storage region 117a included in the non-volatile memory 117 is given searches for a block (hereinafter, referred to as a last writing block) in which the upper-level counter value is written last in the upper-level counter value storage region 117a to acquire the block number (hereinafter, referred to as a last writing block number) allocated to the last writing block (step S31). In the example illustrated in FIG. 9, since the last writing block is the block B3, the last writing block number "3" is acquired in step S31. Note that the last writing block in the upper-level counter value storage region 117a may be managed by, for example, a pointer pointing the last writing block.

Next, the CPU 111 acquires the upper-level counter value written in the last writing block (step S32).

Here, it is determined whether the last writing block number acquired in step S31 described above is a block number (hereinafter, the maxi-mum block number) allocated to the block having the largest block number among the blocks included in the target page (step S33). Note that, in a case where the upper-level counter values are written to the plurality of blocks included in the target page so that the block numbers are in ascending order, the block to which the maximum block number is allocated corresponds to a block in which the upper-level counter value is written last in the target page (the plurality of blocks).

When it is determined that the last writing block number is the maximum block number (YES in step S33), the upper-level counter values have been written to all the blocks included in the target page, so that a process of erasing the upper-level counter values (that is, the data in the target page) written in the target page is executed (step S34).

When the process in step S35 is executed, the CPU 111 sets the block number (hereinafter, a writing block number) allocated to the block in which the next upper-level counter value is written to "0" (that is, the block number allocated to the block having the smallest block number among the plurality of blocks included in the target page) (step S35).

Next, the CPU 111 increments the upper-level counter value acquired in step S32 (step S36).

The upper-level counter value incremented in step S36 is written to the block to which the block number "0" set in step S35 is allocated (step S37).

On the other hand, when it is determined that the last writing block number is not the maximum block number (NO in step S33), a value (number) obtained by incrementing the last writing block number is set as the writing block number (step S38).

When the process of step S38 is executed, the process of steps S36 and S37 is executed. In this case, in step S37, the upper-level counter value incremented in step S36 may be written to the block to which the writing block number set in step S38 is allocated.

According to the upper-level counter value update process described above, the upper-level counter value can be appropriately updated in response to activation of the information processing apparatus 10, and can be written in the non-volatile memory 117 (the upper-level counter value storage region 117a).

Note that the block numbers and the like described in FIGS. 9 and 10 are examples, and in the present embodiment, the upper-level counter value updated in response to activation of the information processing apparatus 10 may be appropriately managed in the upper-level counter value storage region 117a.

(Description of Effects of FIGS. 9 and 10)

Here, an effect of increasing the number of counts of high-order bits by the MCU built-in flash using the characteristics of the flash memory will be described. In the present embodiment, the upper-level counter value updated in response to activation of the information processing apparatus 10 is stored in the non-volatile memory 117, and the upper-level counter value is written in a recordable manner in at least one page of the non-volatile memory 117 (flash memory). The recordable manner is a format in which data is written in a minimum writing unit (block unit) while changing an address.

In this case, for example, when the size of data written to one page is 4 KB (4096 B) and the minimum writing unit (that is, the size of data to be written in one block) is 16 B, the upper-level counter value can be written to one page 4096/16=256 times, and when the upper-level counter values are written to all the blocks included in one page, the data written to the page is erased, so that the updated upper-level counter value can be written to the page again.

According to this, for example, when the number of times of rewriting (that is, the rewriting life) until the non-volatile memory 117 reaches the end of life is 100,000 times and one page is allocated to the upper-level counter value storage region 117a included in the non-volatile memory 117, the upper-level counter value can be updated (that is, written) $256 \times 10^5$ times until the non-volatile memory 117 reaches the end of life.

Note that 20 years correspond to $630 \times 10^6$ seconds, and when the information processing apparatus 10 repeats an operation of activating (reactivating) once in 10 seconds, it is necessary to write the upper-level counter values in the non-volatile memory 117 (upper-level counter value storage region 117a) $63 \times 10^6$ times in 20 years. In this case, by allocating 3 pages of the non-volatile memory 117 having the number of times of rewriting of 100,000 times to the upper-level counter value storage region 117a, it is possible to manage the upper-level counter value for 20 years or more.

When the information processing apparatus 10 is operating normally, as described above, an operation of activating the information processing apparatus once every 10 seconds is not performed, and, for example, even in a case where such an operation is forcibly performed due to a remote cyberattack or the like, it is possible to secure the non-volatile memory 117 for 20 years or more until the non-volatile memory reaches the end of life. That is, it can be said that the information processing apparatus 10 (MCU 11) according to the present embodiment is suitable, for example, for use in maintaining time series data acquired at a high frequency over a long period of time.

Although the upper-level counter value is described here, it is sufficient that a region of the volatile memory (counter built-in memory) in which the lower-level counter value does not overflow is allocated to the lower-level counter value.

Figure 11:
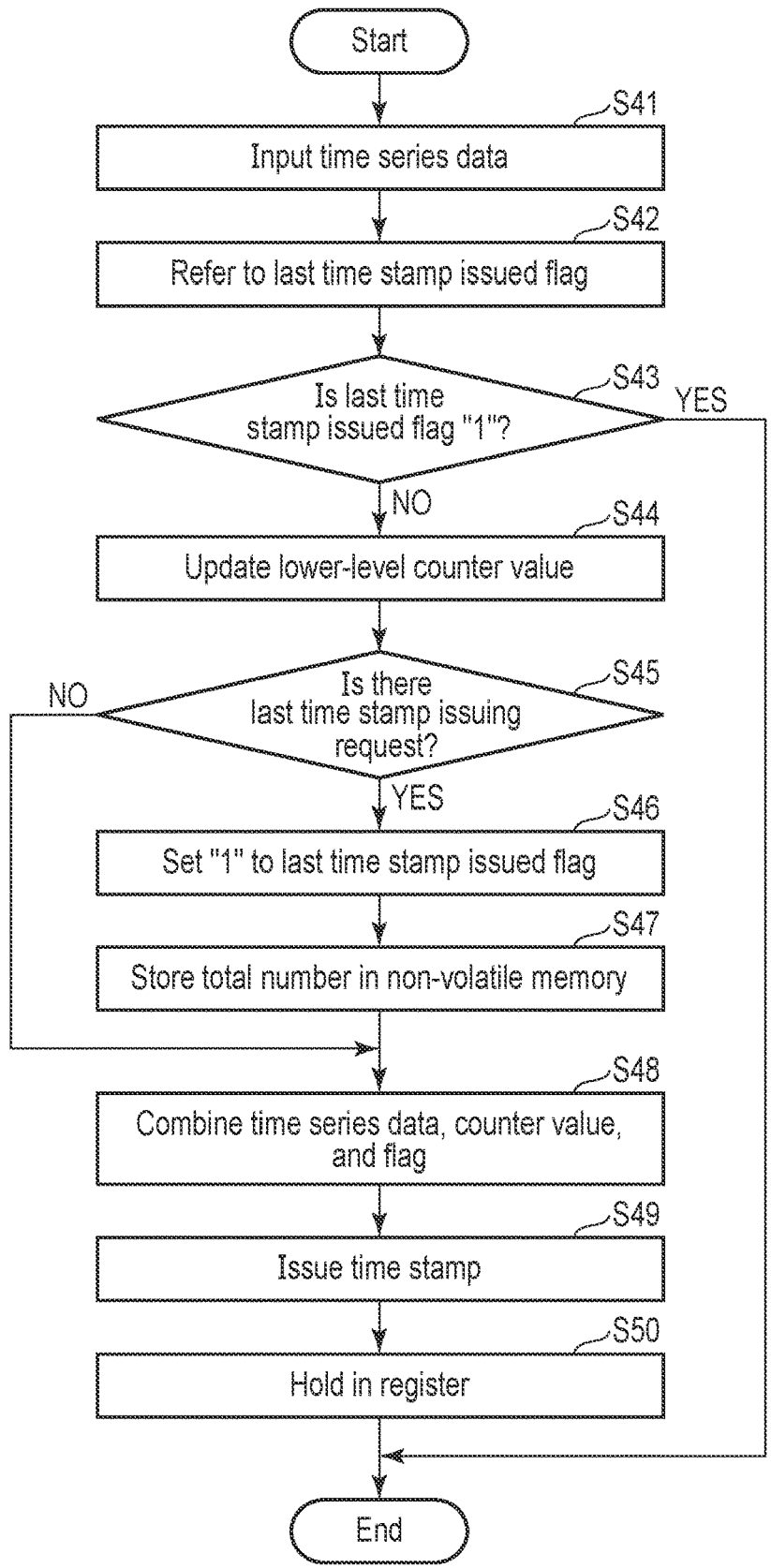
FIG. 11 is a flowchart illustrating an example of a processing procedure of the MCU in a case where the total number of pieces of time series data is stored in a non-volatile memory.

(Description of FIG. 11)

Furthermore, in the present embodiment, in the description, the total number of pieces of time series data can be grasped by grasping the number of pieces of time series data for each activation cycle based on the counter value (upper-level counter value and lower-level counter value) and the last bit flag saved in the micro SD card 12, but the total number of pieces of time series data may be stored in a predetermined region included in the non-volatile memory 117 (a region different from the upper-level counter value storage region 117a secured in the non-volatile memory 117). Note that the predetermined region in which the total number of pieces of time series data is stored may be, for example, the additional information storage region 117d.

Here, FIG. 11 is a flowchart illustrating an example of a processing procedure of the MCU 11 in a case where the total number of pieces of time series data is stored in the non-volatile memory 117 (additional information storage region 117d). Here, a processing procedure of the MCU 11 after the execution of the time series data processing application is started will be described. Note that, at the time when the process illustrated in FIG. 11 is executed, it is assumed that the total number (hereinafter, expressed as the total number of pieces of time series data up to the previous time) of time series data processed until the end of the previous activation cycle is stored in the non-volatile memory 117.

First, the process of steps S41 to S46 corresponding to the process of steps S21 to S26 illustrated in FIG. 5 is executed.

In a case where the last bit flag "1" is set to the last time stamp issued flag in step S46, the total number of pieces of time series data is calculated, and the calculated total number of pieces of time series data is stored in the non-volatile memory 117 (step S47). As described above, the total number of pieces of time series data up to the previous time is stored in the non-volatile memory 117, but in step S47, the total number of pieces of time series data obtained by adding the lower-level counter value (that is, the number of pieces of time series data processed in the current activation cycle) to the total number of pieces of time series data up to the previous time ray be stored in the non-volatile memory 117.

When the process of step S47 is executed, the process of steps S48 to S50 corresponding to the process of steps S27 to S29 illustrated in FIG. 5 is executed.

As described above, with the configuration in which the total number of pieces of time series data is stored in the non-volatile memory 117, even when the time stamp in which the last data flag is set is deleted by an unauthorized application, the total number of times of time of issuing the issued time stamp can be validated.

Although detailed description is omitted here, it is assumed that the total number of pieces of time series data described above is written in the non-volatile memory 117 in a recordable manner as in the upper-level counter value. According to this, it is possible to prolong the life of the non-volatile memory 117.

Note that since the total number of pieces of time series data is written (updated) to the non-volatile memory 117 at the timing (that is, the timing at which the information processing apparatus 10 is shut down) when the last bit flag "1" is set to the last time stamp issued flag 116$h$, the number of times of writing the total number of pieces of time series data to the non-volatile memory 117 is the same as the number of times of writing the upper-level counter value updated at the timing when the information processing apparatus 10 is activated is written to the non-volatile memory 117. Therefore, it is preferable to allocate, as a region of the non-volatile memory 117 in which the total number of pieces of time series data is stored, a region similar to a region in which the upper-level counter value is stored (upper-level counter value storage region 117$a$).

Furthermore, in the present embodiment, in the description, for example, the upper-level counter value is updated in response to activation (that is, execution of a process of activating the information processing apparatus 10) of the information processing apparatus 10, and the last bit flag "1" is set when shutdown (that is, execution of a process of stopping the information processing apparatus 10) of the information processing apparatus 10 is started, but the operation of updating the upper-level counter value (first operation) and the operation of setting the last bit flag "1" (second operation) may be other operations.

(Description of Remote Attestation)

Here, as described above, in a case where the information processing apparatus 10 is communicably connected to the server apparatus 20, various requests are transmitted from the server apparatus 20 to the information processing apparatus 10, and the information processing apparatus 10 may execute a process based on the requests.

Note that the request transmitted from the server apparatus 20 to the information processing apparatus 10 includes, for example, an a testation request. This attestation request is a request when the server apparatus 20 validates that the remote information processing apparatus 10 is operating normally. In a case where the attestation request is received, the information processing apparatus 10 executes a process of returning a response (that is, the validation result) to the attestation request to the server apparatus 20.

In the present embodiment, the upper-level counter value may be updated when such a process based on the attestation request (hereinafter, referred to as an attestation process) is executed.

Hereinafter, an example of a processing procedure for updating the upper-level counter value according to the attestation process (first operation) will be described with reference to the flowchart of FIG. 12.

First, it is assumed that an attestation request (remote attestation message) is transmitted from the server apparatus 20 to the information processing apparatus 10 in a state where the time series data processing application is executed by the CPU 111. In this case, the MCU 11 acquires the attestation request transmitted from the server apparatus 20 (step S61). Note that the attestation request is assumed to be periodically transmitted from the server apparatus 20, for example.

When the process of step S61 is executed, the execution of the time series data processing application is suspended, and the CPU 111 executes the attestation firmware (FW) stored in the ROM 112 and starts an attestation process (step S62). In this case, the CPU 111 that executes the attestation firmware is given the access right described above.

Here, for example, the attestation request may be encrypted using a secret key issued in the server apparatus 20. In this case, the CPU 111 verifies the attestation request using a public key (a public key paired with a secret key used to encrypt the attestation request) issued in the server apparatus 20 (step S63). Note that the public key for verifying the attestation request may be stored in advance in a predetermined region or the like of the non-volatile memory 117.

When the process of step S63 is executed, it is determined whether the verification of the attestation request in step S63 is successful (step S64).

Figure 12:
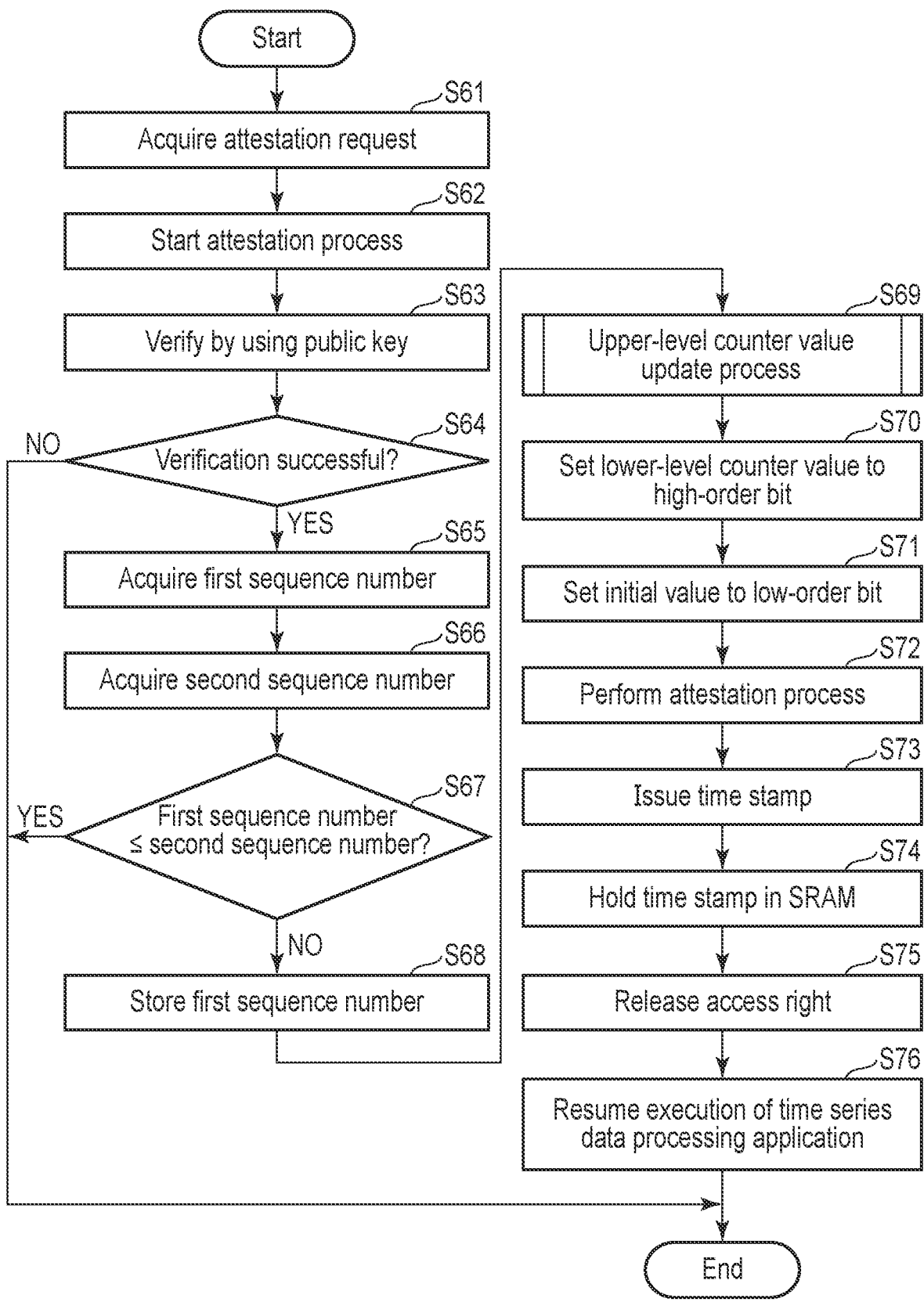
FIG. 12 is a flowchart illustrating an example of a processing procedure when an upper-level counter value is updated in accordance with an attestation process.

When it is determined that the verification of the attestation request is not successful (that is, it has failed) (NO in step S64), the process (that is, the attestation process) illustrated in FIG. 12 is terminated abnormally.

On the other hand, when it is determined that the verification of the attestation request is successful (step S64), the CPU 111 acquires a sequence number included in the attestation request (step S66). Note that this sequence number is, for example, a number sequentially assigned to the attestation request that is periodically transmitted as described above. In the following description, the sequence number acquired in step S65 is referred to as a first sequence number.

Here, it is assumed that the additional information storage region 117$d$ included in the non-volatile memory 117 stores the sequence number included in the previous attestation request (that is, the attestation request acquired before the attestation request acquired in step S61).

In this case, the CPU 111 acquires the sequence number (hereinafter, referred to as a second sequence number) stored in the additional information storage region 117$d$ (step S66).

Next, it is determined whether the first sequence number is equal to or smaller than the second sequence number (step S67).

Assuming that the sequence number is a number allocated in descending order to the attestation request periodically transmitted from the server apparatus 20, in a case where the first sequence number is equal to or less than the second sequence number, it can be determined that the attestation request acquired in step S61 may be an attestation request or the like transmitted from the server apparatus 20 in the past.

Therefore, when it is determined that the first sequence number is equal to or smaller than the second sequence number (NO in step S67), the process illustrated in FIG. 12 is abnormally ended.

On the other hand, when it is determined that the first sequence number is larger than the second sequence number (YES in step S67), the first sequence number described above is stored as the second sequence number in the non-volatile memory 117 (additional information storage region 117d) (step S68).

When the process of step S68 is executed, the process of steps S69 to S71 corresponding to the process of steps S4 to S6 illustrated in FIG. 4 is executed.

Next, the CPU 111 executes the attestation process (step S72). In this estimation process, a process of detecting a state of internal data of the firmware being executed (attestation firmware), such as destruction of a stack, is executed.

When the process of step S72 is performed, the result of the attestation process performed in step S72 is transmitted to the server apparatus 20, and the time stamp issuing unit 116d issues a time stamp corresponding to combined data of the above attestation request, the result of the attestation process, the counter value, and the last bit flag (step S73). Note that the process in step S73 is a process corresponding to the process and the like in step S7 illustrated in FIG. 4 described above, and thus a detailed description thereof will be omitted here.

When the process of step S73 is executed, the process of steps S74 and S75 corresponding to the process of steps S8 and S9 illustrated in FIG. 4 is executed.

When the process of step S75 is executed, the execution of the time series data processing application suspended by the attestation request is resumed (step S76).

Note that, although not illustrated in FIG. 12, the time stamp held in the SRAM 113 in step S74, together with the attestation request, a result of the attestation process, the counter value, and the last bit flag, is output to the micro SD card 12, and is saved in the micro SD card 12.

In step S73, in the description, the time stamp corresponding to the combined data of the attestation request, the result of the attestation process, and the counter value is issued, but, for example, the time stamp corresponding to the combined data of the result of the attestation process and the counter value may be issued. In this case, the time stamp, together with the result of the attestation process, the counter value, and the last bit flag, may be output to the micro SD card 12.

Furthermore, as described above, in a case where the attestation request is transmitted from the server apparatus 20, the upper-level counter value is updated according to the attestation process. Therefore, for example, the process of steps S26 to S28 illustrated in FIG. 5 may be executed at the timing before the process of step S69 is executed. In this case, when the process of step S69 is executed, the last bit flag "0" may be reset to the last time stamp issued flag 116h.

By issuing the time stamp corresponding to the attestation request, the result of the attestation process, the counter value, and the last bit flag as described in FIG. 12, it is possible to prevent counterfeiting of the attestation request and the result of the attestation process, and to identify the execution time of the attestation process by the counter value.

As described above, in the present embodiment, the upper-level counter value may be updated according to execution of a process based on a predetermined request transmitted from the server apparatus 20, such as the attestation request.

In the present embodiment, in the description, the last bit flag is set to the last time stamp issued flag 116h. However, in the present embodiment, when the upper-level counter value is managed in the non-volatile memory 117 (upper-level counter value storage region 117a) and the lower-level counter value is managed in the volatile memory (counter built-in memory), the last bit flag may not be used.

(Description of Software Process)

Here, in the present embodiment, in the description, the security function (that is, the time stamp management unit 116) including issuance of a time stamp is implemented as a hardware module, but the security function may be implemented as a functional module by software.

Figure 13:
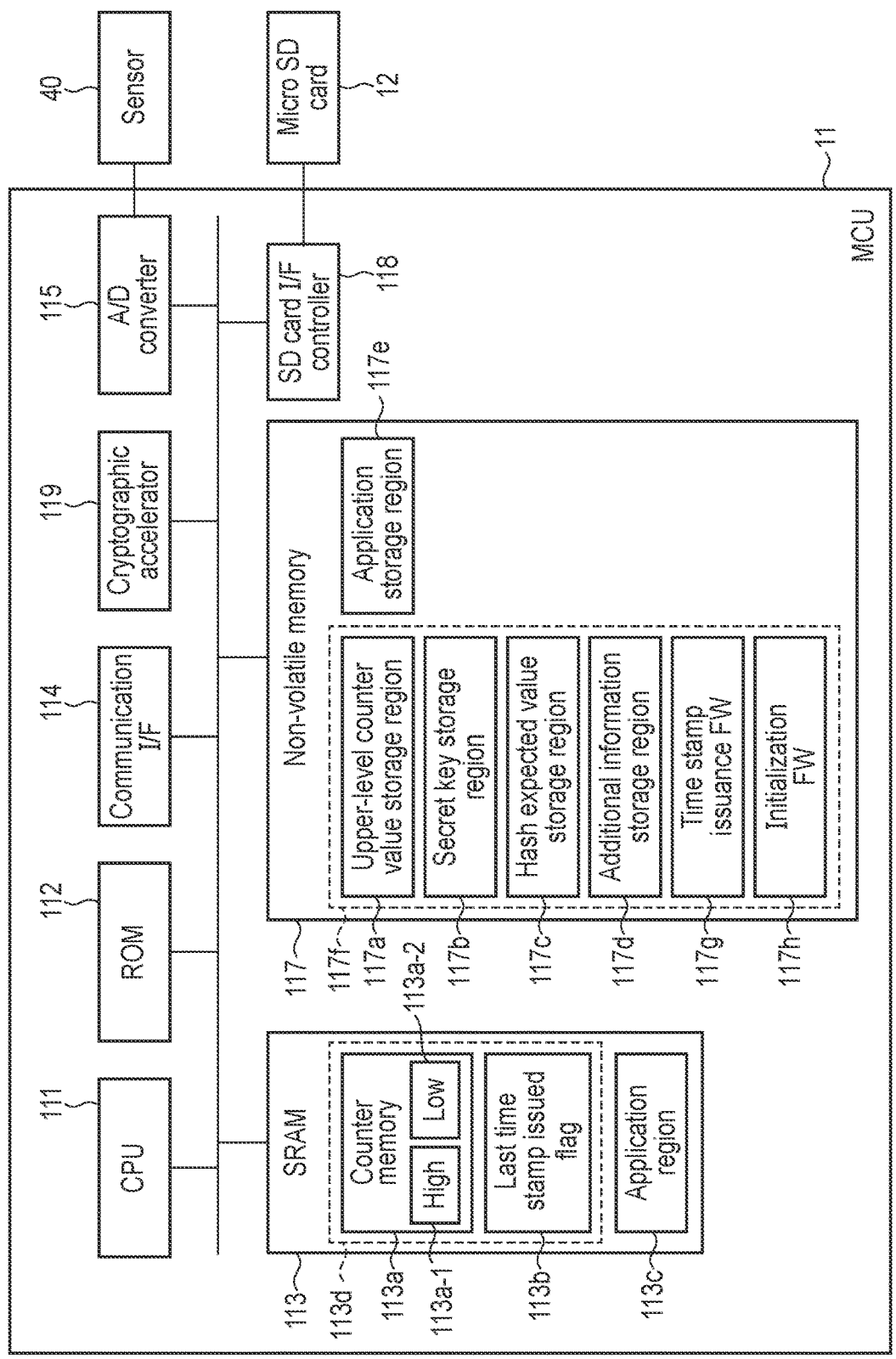
FIG. 13 is a block diagram illustrating an example of a configuration of the MCU in a case where a security function in the present embodiment is realized as a functional module by software.

FIG. 13 is a block diagram illustrating an example of a configuration of the MCU 11 in a case where the security function in the present embodiment described above is implemented as a functional module by software.

Note that, in the description of FIG. 13, parts similar to those in FIG. 3 described above are denoted by the same reference numerals, detailed description thereof is omitted, and parts different from those in FIG. 3 will be described.

As illustrated in FIG. 13, the MCU 11 includes an SRAM 113, and the SRAM 113 includes a counter memory 113a (a region 113a-1 corresponding to the high-order bit storage unit 116f-1 and a region 113a-2 corresponding to the low-order bit storage unit. 116f-2) allocated to a counter corresponding to the counter register 116f described in the present embodiment, and a last time stamp issued flag 113b corresponding to the last time stamp issued flag 116h. In addition, the SRAM 113 further includes an application region 113c and the like used when the time series data processing application is executed. In addition, in order to protect the counter value and the last time stamp issued flag from falsification by (an unauthorized program that has acquired the authority of) the application, memory protection 113d that isolates a memory region including the counter value and the last time stamp issued flag from the application region 113c is applied to the memory region. As means for realizing the memory protection 113d, a memory protection function (MPU) built in the CPU 111 and the like are available.

The non-volatile memory 117 stores, for example, time stamp issuance firmware (FW) 117g and initialization firmware (FW) 117h. In the case of the configuration illustrated in FIG. 13, the above-described security function (the function of the time stamp management unit 116 illustrated in FIG. 3) is implemented by the CPU 111 (that is, the computer of the MCU 11) executing the time stamp issuance firmware 117g. In addition, the initialization firmware 117h corresponds to the initialization firmware described in FIG. 4 and the like in the present embodiment. As in the SRAM, in order to protect from falsification by (an unauthorized program that has acquired the authority of) the application and unauthorized acquisition of the secret key, the region 117f other than the application storage region 117e is prohibited from being accessed by the application. Means such as the MPU is available.

Furthermore, in the example illustrated in FIG. 13, the MCU 11 includes a cryptographic accelerator 119. In the configuration illustrated in FIG. 13, a time stamp is issued by a software process, but calculation of a hash value at the time of issuing the time stamp may be performed using the cryptographic accelerator 119. According to this, the time stamp issuing process can be speeded up.

Note that the configuration illustrated in FIG. 13 is an example, and the MCU 11 (information processing apparatus 10) may have a different configuration as long as the above-described security function is implemented by software.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising a controller, wherein:
the controller includes:
an instruction executer configured to generate or acquire data;
an issuer configured to accept a request for time stamp issuance for the data and issues a time stamp;
a first updater configured to update a first counter value for managing an order of the data according to a first operation of the electronic apparatus;
a second updater configured to update a second counter value for managing an order of the data in accordance with issuance of the time stamp;
a first non-volatile memory to hold the first counter value and a secret key; and
a volatile register to hold the second counter value,
the time stamp is a message authentication code or a digital signature issued from the first counter value, the second counter value, and the data using the secret key,
the second counter value is not stored in the first non-volatile memory,
the controller further includes a last time stamp issuance controller configured to be set by the instruction executer, and sets a last time stamp issued flag,
the last time stamp issued flag is set to OFF in the first operation,
an operation of setting the last time stamp issued flag to ON and last time stamp issuance are performed based on a setting of the last time stamp issuance controller, and
in a state where the last time stamp issued flag is turned ON, reception of time stamp issuance is prohibited, and an operation of turning OFF the last time stamp issued flag is prohibited.

2. The electronic apparatus according to claim 1, wherein the first operation includes execution of a process of activating the electronic apparatus.

3. The electronic apparatus according to claim 1, wherein the first non-volatile memory is a flash memory.

4. The electronic apparatus according to claim 3, wherein the first counter value is written in a first region secured in the flash memory in a recordable manner.

5. The electronic apparatus according to claim 4, wherein:
the flash memory further stores information indicating a total number of pieces of the data, and
the information indicating the total number of pieces of the data is stored in a recordable manner in a second region different from the first region secured in the flash memory.

6. The electronic apparatus according to claim 1, wherein the issuer issues a time stamp corresponding to identification information for identifying a version of software running on the electronic apparatus during the first operation of the electronic apparatus.

7. The electronic apparatus according to claim 1, wherein:
the electronic apparatus is communicably connected to a server apparatus,
the first operation of the electronic apparatus includes execution of a process based on a predetermined request transmitted from the server apparatus, and
the issuer issues a time stamp corresponding to a processing result based on the predetermined request.

8. The electronic apparatus according to claim 1, wherein the controller is a one-chip microcontroller.

9. The electronic apparatus according to claim 1, wherein the time stamp, the first counter value, and the second counter value are output to a second non-volatile memory connected to the controller.

10. A method executed by an electronic apparatus comprising a controller including an instruction executer, a non-volatile memory, and a volatile register, the method comprising:
generating or outputting data by the instruction executer;
accepting a request for time stamp issuance for the data and issuing a time stamp;
updating a first counter value for managing an order of the data according to a first operation of the electronic apparatus;
updating a second counter value for managing an order of the data according to issuance of the time stamp;
holding the first counter value and a secret key in the non-volatile memory; and
holding the second counter value in the volatile register, wherein:
the time stamp is a message authentication code or a digital signature issued from the first counter value, the second counter value, and the data using the secret key,
the second counter value is not stored in the non-volatile memory,
the controller further includes a last time stamp issuance controller configured to be set by the instruction executer, and a last time stamp issued flag is set,
the last time stamp issued flag is set to OFF in the first operation,
an operation of setting the last time stamp issued flag to ON and last time stamp issuance are performed based on a setting of the last time stamp issuance controller, and
in a state where the last time stamp issued flag is turned ON, reception of time stamp issuance is prohibited, and an operation of turning OFF the last time stamp issued flag is prohibited.

11. A non-transitory computer-readable storage medium having stored thereon a computer program which is executable by a computer of a controller in an electronic apparatus, the computer program comprising instructions for controlling the computer to perform processes comprising:
generating or acquiring data by an instruction executer included in the controller;
accepting a request for time stamp issuance for the data and issuing a time stamp;
updating a first counter value for managing an order of the data according to a first operation of the electronic apparatus;
updating a second counter value for managing an order of the data according to issuance of the time stamp;
holding the first counter value and a secret key in a non-volatile memory included in the controller; and holding the second counter value in a volatile register included in the controller, wherein:

the time stamp is a message authentication code or a digital signature issued from the first counter value, the second counter value, and the data using the secret key, the second counter value is not stored in the non-volatile memory, the controller further includes a last time stamp issuance controller configured to be set by the instruction executer, and a last time stamp issued flag is set, the last time stamp issued flag is set to OFF in the first operation, an operation of setting the last time stamp issued flag to ON and last time stamp issuance are performed based on a setting of the last time stamp issuance controller, and in a state where the last time stamp issued flag is turned ON, reception of time stamp issuance is prohibited, and an operation of turning OFF the last time stamp issued flag is prohibited.

\* \* \* \* \*